United States Patent
Kikuchi et al.

(10) Patent No.: US 8,163,391 B2
(45) Date of Patent: Apr. 24, 2012

(54) SURFACE TREATED STEEL SHEET

(75) Inventors: Ikuo Kikuchi, Tokyo (JP); Toshiyuki Katsumi, Tokyo (JP); Kimitaka Hayashi, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 422 days.

(21) Appl. No.: 12/519,658

(22) PCT Filed: Dec. 3, 2007

(86) PCT No.: PCT/JP2007/073347
§ 371 (c)(1),
(2), (4) Date: Jun. 17, 2009

(87) PCT Pub. No.: WO2008/075553
PCT Pub. Date: Jun. 26, 2008

(65) Prior Publication Data
US 2010/0068513 A1   Mar. 18, 2010

(30) Foreign Application Priority Data

Dec. 20, 2006   (JP) .................................. 2006-343531

(51) Int. Cl.
*B32B 15/095* (2006.01)
(52) U.S. Cl. ..................................... 428/425.8; 428/341
(58) Field of Classification Search ............... 428/425.8, 428/341
See application file for complete search history.

(56) References Cited

FOREIGN PATENT DOCUMENTS

| | | |
|---|---|---|
| JP | 9-241576 A | 9/1997 |
| JP | 2001-31684 A | 2/2001 |
| JP | 2003-13252 A | 1/2003 |
| JP | 2005-288730 A | 10/2005 |
| JP | 2006-118012 A | 5/2006 |
| JP | 2006-152435 A | 6/2006 |
| JP | 2006-152436 A | 6/2006 |
| WO | WO-2003/093533 A1 | 11/2003 |

*Primary Examiner* — Thao T. Tran
(74) *Attorney, Agent, or Firm* — Birch, Stewart, Kolasch & Birch, LLP

(57) ABSTRACT

A surface treated steel sheet has a surface treatment film including a metallic compound containing titanium, a metallic compound containing magnesium, a cationic urethane resin having at least one cationic functional group selected from primary to tertiary amino groups and quaternary ammonium bases, and a cationic phenol polycondensate which is a polycondensate of a phenol compound with an aldehyde and has a cationic functional group, wherein the titanium content in the surface treatment film is in the range of 1 mass % to 4 mass % based on a total solid content; the magnesium content in the surface treatment film is in the range of 0.2 mass % to 2 mass % based on a total solid content; the cationic urethane resin content in the surface treatment film is in the range of 20 mass % to 35 mass % based on a total solid content; the cationic phenol polycondensate content in the surface treatment film is in the range of 25 mass % to 40 mass % based on a total solid content; and the mass ratio of the cationic urethane resin to the cationic phenol polycondensate is in the range of 33.3:66.7 to 49:51.

3 Claims, No Drawings

SURFACE TREATED STEEL SHEET

TECHNICAL FIELD

The present invention relates to a surface treated steel sheet suitable for use in household appliances, building materials, or the like, particularly to an environment-friendly, surface treated steel sheet for which chromium is not used upon production and chromium is not contained at all in the product.

The application claims priority from Japanese Patent Application No. 2006-343531, and the content of which is incorporated herein by reference.

BACKGROUND ART

On a surface of a zinc-plated steel sheet for use in household appliances and building materials, white rust may be formed under a salt component-, such as sea water, containing atmosphere or a high temperature and high humid atmosphere. In this case, the appearance may be significantly deteriorated or ability for protecting a surface of iron base may be lowered. In the past, a chromate-based surface treatment agent containing chromium has been used to prevent white rust. However, regulations on chrome has been significantly intensified in view of problems of effects on environment and the human body, and in response to this, development of a chromium-free surface treatment agent has been proceeded.

As a method for treating the surface of a metallic material with a chromium-free surface treatment agent, in Patent Document 1, there disclosed a method for treating a surface with the use of a metal surface treatment agent containing a specific silane coupling agent and a phenolic resin-based polymer with a specific structure. In Patent Document 2, there disclosed a method for treating a surface with the use of a metal surface treatment agent containing a silane coupling agent, silica, and a specific metallic compound as the essential components, and further optionally comprising a thiocarbonyl group-containing compound and/or a water-soluble acrylic resin. Further, in Patent Document 3, there disclosed a method for treating a surface with the use of a metal surface treatment agent containing a specific water-soluble resin or water-based emulsion resin, a phenolic resin-based polymer with a specific structure, and a specific metallic compound.

However, the above-mentioned methods are not for forming a film imparting high corrosion resistance in place of the chromate-based surface treatment agent. In particular, corrosion resistance of scratched parts and formed parts, or corrosion resistance after degreasing with alkali, is deteriorated as compared to the chromate film. Consequently, development of a method for treating a surface having a corrosion resistance equal to or better than that of a chromate film and not containing chromium has been demanded.

Furthermore, as a method for treating the metallic material surface containing no chromium, in Patent Document 4, there disclosed a surface treatment agent for metal prepared by blending a cationic urethane resin, a cationic polycondensate of a phenolic compound, a zirconium compound, and/or a titanium compound, in an aqueous medium; a surface treatment method; and a surface treated metallic material. In Patent Document 5, there disclosed a metal surface treatment agent prepared by blending a cationic urethane resin, a cationic polycondensate of a phenolic compound, a zirconium compound, and a compound containing at least one metal selected from Li, Mg, Al, Ca, Mn, Co, Ni, Zn, Sr, W, Ce, and Mo, in an aqueous medium; a surface treatment method; and a surface treated metallic material. In addition, in Patent Document 6, there disclosed a metal surface treatment agent prepared by blending a cationic urethane resin, a cationic polycondensate of a phenolic compound, a titanium compound, and a compound containing at least one metal selected from Li, Mg, Al, Ca, Mn, Co, Ni, Zn, Sr, W, Ce, and Mo, in an aqueous medium; a surface treatment method; and a surface treated metallic material, etc.

[Patent Document 1] Japanese Unexamined Patent Application, First Publication No. H09-241576
[Patent Document 2] Japanese Unexamined Patent Application, First Publication No. 2001-31684
[Patent Document 3] Japanese Unexamined Patent Application, First Publication No. 2003-13252
[Patent Document 4] Japanese Unexamined Patent Application, First Publication No. 2006-118012
[Patent Document 5] Japanese Unexamined Patent Application, First Publication No. 2006-152435
[Patent Document 6] Japanese Unexamined Patent Application, First Publication No. 2006-152436

DISCLOSURE OF THE INVENTION

Problems to be Solved by the Invention

However, the above-mentioned three methods are not satisfactory in providing corrosion resistance on a planar surface (white rust resistance) and ethanol resistance, particularly corrosion resistance after forming such as cup molding which is close to an actual use than the simple bulge molding. Consequently, development of a method for treating the surface having corrosion resistance after forming which is required, for example, in motor cases or cartridge tanks for kerosene stoves and containing no chromium has been demanded.

The present invention is to solve the problems of related art mentioned above, and an object of which is to provide a chromium-free, steel sheet subjected to a metal surface treatment, for which a film excellent in corrosion resistance after forming can be formed on the surface of a zinc-plated steel sheet.

Means for Solving the Problems

The present inventors have carried out an investigation on constitutions of a film for a surface treated steel sheet to solve the above-mentioned problems. As a result, they have found that a surface treated steel sheet excellent in corrosion resistance after forming can be obtained by forming on the surface of a zinc-plated steel sheet, a surface treatment film which includes a metallic compound containing titanium, a metallic compound containing magnesium, an urethane resin containing a specific cationic functional group, and a cationic phenol polycondensate with a specific chemical structure, and thus they have completed the present invention.

That is, the present invention provides a surface treated sheet including a surface treatment film which includes (A) a metallic compound containing titanium (hereinafter, referred to as 'titanium compound (A)'), (B) a metallic compound containing magnesium (hereinafter, referred to as 'magnesium compound (B)'), (C) a cationic urethane resin having at least one cationic functional group selected from primary to tertiary amino groups and quaternary ammonium bases, and (D) a cationic phenol polycondensate which is a polycondensate of a phenol compound with an aldehyde and has a cationic functional group, wherein the titanium content in the surface treatment film is in the range of 1 mass % to 4 mass % based on a total solid content, the magnesium content in the surface treatment film is in the range of 0.2 mass % to 2 mass % based on a total solid content, a content of the cationic urethane resin (C) in the surface treatment film is in the range of 20 mass % to 35 mass % based on a total solid content, a content of the cationic phenol polycondensate (D) in the surface treatment film is in the range of 25 mass % to 40 mass % based on a total solid content, and the mass ratio of the cationic urethane resin (C) to the cationic phenol polycondensate (D) is in the range of 33.3:66.7 to 49:51.

The coating weight of the surface treatment film may be in the range of from 0.1 g/m² to 3 g/m².

In addition, an organic-inorganic composite film may be further formed on an upper layer of the surface treatment film in a coating weight of 0.2 g/m² to 5 g/m².

Effects of the Invention

The chromium-free surface treated steel sheet related to the present invention provides corrosion resistance after forming equal to or better than that provided with a chromate-based surface treatment agent. The production method thereof is also simple and the steel sheet can be produced at low cost.

BEST MODE FOR CARRYING OUT THE INVENTION

Hereinbelow, preferred embodiments of the present invention will be described in detail.

For the titanium compound (A) in a composition for surface treatment in the invention, there are no particular limitation for counter anions, but examples may include oxides, hydroxides, complex compounds and salts with organic or inorganic acids of titanium, and the like, and those having a good compatibility with the cationic urethane resin (C) and the cationic phenol polycondensate (D) are preferable. Specific examples of the titanium compound (A) include titanyl sulfate $TiOSO_4$, diisopropoxytitanium bisacetylacetone $(C_5H_7O_2)_2Ti[OCH(CH_3)_2]_2$, a reaction product of lactic acid and titanium alkoxide, titanium laurate, titanium acetylacetonate $Ti(OC(=CH_2)CH_2COCH_3))_3$, titanium acetate, titanium nitrate, titanium sulfate, titanium phosphate, titanium carbonate, titanium hydrofluorate, ammonium fluorotitanate, and the like.

The titanium compound (A) contains 1 mass % to 4 mass % of titanium based on a total solid content. At a content less than 1 mass %, corrosion resistance on a planar surface (white rust resistance) is insufficient, and at a content greater than 4 mass %, the resin readily forms into a gel in a coating liquid state, thereby causing a deteriorated corrosion resistance after cylindrical forming due to an insufficient film formability.

For the magnesium compound (B) in a composition for surface treatment in the invention, there are no particular limitation for counter anions, but examples may include oxides, hydroxides, complex compounds and salts with organic or inorganic acids of magnesium, and the like, and those having a good compatibility with the cationic urethane resin (C) and the cationic phenol polycondensate (D) are preferable. Specific examples include magnesium nitrate, magnesium sulfate, magnesium biphosphate, magnesium carbonate, magnesium acetate, magnesium fluoride, magnesium oxide, magnesium hydroxide, and the like.

The magnesium compound (B) contains 0.2 mass % to 2 mass % of magnesium based on a total solid content. At a content less than 0.2 mass %, corrosion resistance on a planar surface (white rust resistance) is insufficient, and at a content greater than 2 mass %, the resin readily forms into a gel in a coating liquid state, thereby causing a deteriorated corrosion resistance after cylindrical forming due to an insufficient film formability. In addition, coatability of top coating tends to deteriorate.

The contents of titanium and magnesium in the above-described composition for surface treatment can be, for example, determined with the use of ICP (Inductively Coupled Plasma) emission spectrometry or the like.

The term 'cationic' for the cationic urethane resin (C) which to be blended in the metal surface treatment agent of the present invention means that the resin has a cationic functional group in the molecular structure. The cationic functional group may be exemplified by groups represented by the following general formulas (I) to (IV), or the like. The cationic functional group may be included in any amount as long as the resin stably exists in a dissolution or dispersion state in the metal surface treatment agent of the invention.

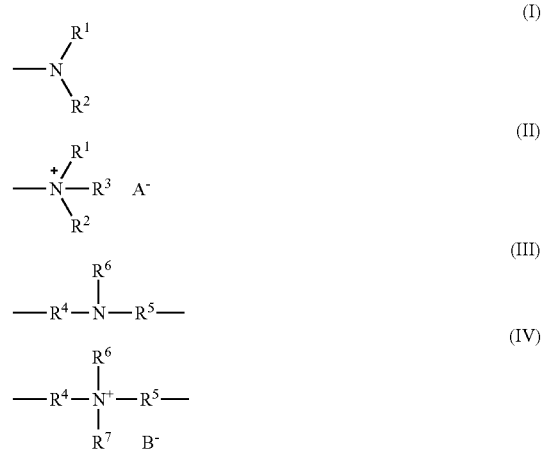

Herein, $R^1$, $R^2$, $R^3$, $R^6$, and $R^7$ in general formulas are each independently a hydrogen atom, a linear or branched alkyl group having 1 to 10, preferably 1 to 6 carbon atom(s), or a linear or branched hydroxyalkyl group having 1 to 10, preferably 1 to 6 carbon atom(s). $R^4$ and $R^5$ are each independently a linear or branched alkylene group having 2 to 10, preferably 2 to 6 carbon atoms. Each of $A^-$ and $B^-$ represents a hydroxyl ion or an acid ion.

Examples of the alkyl group having 1 to 10 carbon atom(s) represented for $R^1$, $R^2$, $R^3$, $R^6$ and $R^7$ in the above general formulas (I), (II), (III), and (IV) include a methyl group, an ethyl group, a propyl group, an isopropyl group, a butyl group, an isobutyl group, a pentyl group, a hexyl group, a heptyl group, an octyl group, a nonyl group, a decyl group, and the like. In addition, examples of the hydroxyalkyl group having 1 to 10 carbon atom(s) include a hydroxymethyl group, a 2-hydroxyethyl group, a 1-hydroxyethyl group, a 3-hydroxypropyl group, a 4-hydroxybutyl group, a 5-hydroxypentyl group, a 6-hydroxyhexyl group, a 7-hydroxyheptyl group, an 8-hydroxyoctyl group, a 9-hydroxynonyl group, a 10-hydroxydecyl group, and the like. Examples of the alkylene group having 2 to 10 carbon atoms represented for $R^4$ and $R^5$ in the general formulas (III) and (IV) include an ethylene group, a propylene group, a trimethylene group, a tetramethylene group, a pentamethylene group, a hexamethylene group, an octamethylene group, a 2-ethyl-hexylene group, a decamethylene group, and the like. Examples of the acid ion represented for $A^-$ and $B^-$ in the general formulas (II) and (IV) include inorganic acid ions such as halogen ion (chlorine ion, bromine ion, fluorine ion, etc.), sulfate ion, nitrate ion, and phosphate ion, and organic acid ions such as acetate ion and formate ion.

The cationic urethane resin (C) useful in the invention, for example, may either be a water-soluble or aqueous emulsion type.

The cationic urethane resin (C) for use in the invention needs to have the cationic functional group as described above, and the cationic functional group contributes to compatibility with the cationic phenol polycondensate (D) (that is, a cationic polycondensate of a phenol-based compound with an aldehyde (D)), the titanium compound (A), or the magnesium compound (B). Solubility or dispersibility of the cationic urethane resin (C) in water may either be achieved by solubility or dispersibility possessed by the resin itself or by being assisted with a cationic surfactant (e.g., alkyl quaternary ammonium salt, etc.) and/or a nonionic surfactant (e.g., alkyl phenyl ether, etc.).

Examples of the cationic urethane resin (C) include: a urethane resin which is a polycondensate of polyol such as polyol, polyether polyol, or polyester polyol with an aliphatic, alicyclic, or aromatic polyisocyanate wherein polyol having a (substituted) amino group or polyol having a nitrogen atom on its main chain is used as a part of the polyol to be used; a urethane resin wherein a nitrogen atom of the urethane resin is quaternized with a quaternizing agent; and the like.

The polyol mentioned above may be exemplified by aliphatic diol compounds such as ethylene glycol, diethylene glycol, triethylene glycol, 1,2-propylene glycol, 1,3-propylene glycol, neopentyl glycol, 1,2-butylene glycol, 1,3-butylene glycol, 1,4-butylene glycol, hexamethylene glycol, bisphenol A, hydrogenated bisphenol A, trimethylolpropane, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, and 1,10-decanediol; tri- or higher valent aliphatic or alicyclic alcohol compounds such as trimethylolethane, trimethylolpropane, hexitols, pentitols, glycerine, diglycerine, polyglycerine, pentaerythritol, dipentaerythritol, and tetramethylolpropane; or the like.

The polyether polyol mentioned above may be exemplified by ethyleneoxide adducts such as ethylene glycol, diethylene glycol, and triethylene glycol; propyleneoxide adducts such as propylene glycol, dipropylene glycol, and tripropylene glycol; ethyleneoxide and/or propylene oxide adducts of above-mentioned polyols; polytetramethylene glycol; or the like.

The polyester polyol mentioned above may be exemplified by compounds which can be obtained by direct esterification reaction and/or transesterification of the above-mentioned polyol with an ester-forming derivative having a smaller stoichiometric amount such as polyvalent carboxylic acid or anhydride thereof, halide, and esters; compounds which can be obtained by ring-opening reaction of lactones with the above-mentioned polyol; polycarbonate polyol; or the like. Examples of the polyvalent carboxylic acid include aliphatic dicarboxylic acids such as oxalic acid, malonic acid, succinic acid, glutaric acid, adipic acid, pimelic acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, dimer acid, and hydrogenated dimer acid; alicyclic dicarboxylic acids such as cyclohexane dicarboxylic acids; aromatic dicarboxylic acids such as phthalic acid, isophthalic acid, terephthalic acid, and naphthalene dicarboxylic acid; tricarboxylic acids such as trimellitic acid, trimesic acid, and castor oil fatty acid trimer; tetracarboxylic acid such as pyromellitic acid; and the like. Examples of the ester-forming derivative thereof include acid anhydrides of polyvalent carboxylic acid thereof; halides such as chloride or bromide of the polyvalent carboxylic acid; lower aliphatic esters, such as methyl ester, ethyl ester, propyl ester, isopropyl ester, butyl ester, isobutyl ester, or amyl ester, of the polyvalent carboxylic acid; and the like. Examples of the lactones include γ-caprolactone, δ-caprolactone, ε-caprolactone, dimethyl-ε-caprolactone, δ-valerolactone, γ-valerolactone, γ-butyrolactone, and the like.

The above mentioned polyol having a (substituted) amino group or polyol having a nitrogen atom on its main chain may be exemplified by polyol represented by the following general formula (V) or (VI), or the like. Specific examples of such polyol include N,N-dimethylamino dimethylolpropane, N-methyl-N,N-diethanolamine, and the like. The quaternizing agent may be exemplified by $R^3Cl$, $R^3Br$, $R^7Cl$, $R^7Br$, (wherein $R^3$ and $R^7$ have the same meanings as defined in the general formulas (II) and (IV)), or the like.

(V)

(VI)

Herein, $R^1$, $R^2$, $R^4$, $R^5$, and $R^6$ in the above general formulas have the same meanings as defined in the above-mentioned general formulas (I) and (III). $R^8$ represents a linear or branched alkylene group having 2 to 10, preferably 2 to 6 carbon atoms, wherein a —$NR^1R^2$ group is substituted on any of the carbon atoms.

For the cationic urethane resin (C), examples of the aliphatic, alicyclic, or aromatic polyisocyanate include tetramethylene diisocyanate, hexamethylene diisocyanate, lysine diisocyanate ester, hydrogenated xylylene diisocyanate, 1,4-cyclohexylene diisocyanate, 4,4'-dicyclohexylmethane diisocyanate, 2,4'-dicyclohexylmethane diisocyanate, isophorone diisocyanate, 3,3'-dimethoxy-4,4'-biphenylene diisocyanate, 1,5-naphthalene diisocyanate, 1,5-tetrahydronaphthalene diisocyanate, 2,4-tolylene diisocyanate, 2,6-tolylene diisocyanate, 4,4'-diphenyl methane diisocyanate, 2,4'-diphenyl methane diisocyanate, phenylene diisocyanate, xylylene diisocyanate, tetramethyl xylylene diisocyanate, and the like. Among these, when the aliphatic or alicyclic polyisocyanate compound such as tetramethylene diisocyanate, hexamethylene diisocyanate, lysine diisocyanate ester, hydrogenated xylylene diisocyanate, 1,4-cyclohexylene diisocyanate, 4,4'-dicyclohexylmethane diisocyanate, 2,4'-dicyclohexylmethane diisocyanate, or isophorone diisocyanate, is used, a film having excellent weather resistance can be obtained, thus is preferably used.

The cationic urethane resin (C) of the invention, for example, may be a silyl modified, cationic, water-soluble or aqueous emulsion urethane resin. When such silyl-modified urethane resin is used, corrosion resistance and alkali resistance of a film to be formed are further improved. This silyl modification is carried out by using a silane coupling agent at a step of synthesizing a water-soluble or aqueous emulsion urethane resin, and although a more specific modification method is not particularly limited, for example, the medication may be carried out by reacting polyol (polyol having a (substituted) amino group or polyol having a nitrogen atom on a main chain is partly used) with a silane coupling agent, and then polycondensating an aliphatic, alicyclic, or aromatic polyisocyanate, or alternatively by subjecting a polycondensate of polyol (polyol having a (substituted) amino group or polyol having a nitrogen atom on a main chain is partly used) with an aliphatic, alicyclic, or aromatic polyisocyanate to a reaction with a silane coupling agent.

A type of silane coupling agent for use in the silyl modification is not particularly limited. A preferred example of the silane coupling agent for use in the silyl modification include a silane coupling agent having an amino group (primary or secondary amino group) or epoxy group.

An amount of silane coupling agent to be used in the silyl modification is not particularly limited, but the amount, for example, is in the range of preferably 0.05 mass % to 10 mass %, more preferably 0.5 mass % to 5 mass %, based on a sum of mass amounts of the polyol (polyol having a (substituted) amino group or polyol having a nitrogen atom on a main chain is partly used), the aliphatic, alicyclic, or aromatic polyisocyanate, and the silane coupling agent, in the view of exhibiting the above-mentioned effects. The reaction temperature when reacting the silane coupling agent is not particularly limited, and for example, the reaction may be carried out at a temperature between 0° C. and 50° C.

The reason for improved corrosion resistance by silyl modification is not clear, but it is assumed to be because, by silyl modification, adhesiveness of the cationic urethane resin (C) with a metal substrate is increased and further a barrier property is improved by preventing penetration of corrosion factors such as oxygen and chlorine.

Among the above-mentioned cationic urethane resin (C), more preferred are soap-free compounds in which a surfactant as an emulsifier or solubilizer that may cause an adverse effect on adhesiveness of the film to a metallic material or water resistance of the film is not used; and compounds in which the used amount is controlled.

The cationic urethane resin (C) is contained in an amount of 20 mass % to 35 mass % with respect to the total solid content. According to the cationic urethane resin (C) contained in a specific ratio, the corrosion resistance after cylindrical forming can be improved. At a content less than 20 mass %, corrosion resistance after cylindrical forming is deteriorated, and at a content greater than 35 mass %, ethanol resistance is significantly deteriorated, thereby causing problems such as that the resin readily forms into a gel in a coating liquid state, thus is not preferable.

The term 'cationic' for the cationic phenol polycondensate (D) (that is, a cationic phenol polycondensate of a phenol compound with an aldehyde) which to be contained in the metal surface treatment agent of the invention means that the polycondensate has a cationic functional group. The cationic functional group may be exemplified by groups represented by the following general formula (I) or (II). The cationic phenol polycondensate (D) should have at least one of such cationic functional groups. These functional groups, for example, can be introduced by allowing ammonia or amine corresponding to the (substituted) amino group represented in the general formula (I) to be co-existed when carrying out a polycondensation of phenol compound with aldehyde. The cationic phenol polycondensate (D) for use in the invention is preferably, for example, a novolak phenol polycondensate obtained by carrying out the polycondensation reaction in the presence of an acid catalyst. The cationic phenol polycondensate (D) for use in the invention may also be those obtained by modifying the above-mentioned novolak phenol polycondensate in accordance with a generally known technique such as a boron modification, a silicon modification, a phosphorus modification, a heavy metal modification, a nitrogen modification, a sulfur modification, an oil modification, or a rosin modification.

The phenol compound which to be used for obtaining the cationic phenol polycondensate (D) for use in the invention is not particularly limited as long as the cationic phenol polycondensate (D) can be formed by a polycondensation with aldehyde in the presence of an acid catalyst and ammonia or amine corresponding to the (substituted) amino group represented in the above general formula (I). Examples of such phenol compound include phenol, m-cresol, m-ethylphenol, m-propylphenol, m-butylphenol, p-butylphenol, o-butylphenol, resorcinol, hydroquinone, catechol, 3-methoxyphenol, 4-methoxyphenol, 3-methylcatechol, 4-methylcatechol, methylhydroquinone, 2-methyhesorcinol, 2,3-dimethylhydroquinone, 2,5-dimethylresorcinol, 2-ethoxyphenol, 4-ethoxyphenol, 4-ethylresorcinol, 3-ethoxy-4-methoxyphenol, 2-propenylphenol, 2-isopropylphenol, 3-isopropylphenol, 4-isopropylphenol, 3,4,5-trimethylphenol, 2-isopropoxyphenol, 4-propoxyphenol, 2-allylphenol, 3,4,5-trimethoxyphenol, 4-isopropyl-3-methylphenol, pyrogallol, phloroglycinol, 1,2,4-benzenetriol, 5-isopropyl-3-methylphenol, 4-butoxyphenol, 4-t-butylcatechol, t-butylhydroquinone, 4-t-pentylphenol, 2-t-butyl-5-methylphenol, 2-phenylphenol, 3-phenylphenol, 4-phenylphenol, 3-phenoxyphenol, 4-phenoxyphenol, 4-hexyloxyphenol, 4-hexanoylresorcinol, 3,5-diisopropylcatechol, 4-hexylresorcinol, 4-heptyloxyphenol, 3,5-di-t-butylphenol, 3,5-di-t-butylcatechol, 2,5-di-t-butylhydroquinone, di-sec-butylphenol, 4-cumylphenol, nonylphenol, 2-cyclopentylphenol, 4-cyclopentylphenol, bisphenol A, bisphenol F, and the like. These may be used alone or in combination of two or more kinds. Among these, preferred are phenol, o-cresol, m-cresol, p-cresol, bisphenol A, 2,3-xylenol, 3,5-xylenol, m-butylphenol, p-butylphenol, o-butylphenol, 4-phenylphenol, and resorcinol, and most preferred examples are phenol and bisphenol A.

The aldehyde which to be used for obtaining the cationic phenol polycondensate (B) for use in the invention is not particularly limited as long as the cationic phenol polycondensate (B) can be formed by a polycondensation with the phenol compound in the presence of an acid catalyst and ammonia or amine corresponding to the (substituted) amino group represented in the above general formula (I). Examples of such aldehyde include formaldehyde, trioxane, furfural, paraformaldehyde, benzaldehyde, methylhemiformal, ethylhemiformal, propylhemiformal, butylhemiformal, phenylhemiformal, acetoaldehyde, propylaldehyde, phenylacetaldehyde, α-phenylpropylaldehyde, β-phenylpropylaldehyde, o-hydroxybenzaldehyde, m-hydroxybenzaldehyde, p-hydroxybenzaldehyde, o-chlorobenzaldehyde, o-nitrobenzaldehyde, m-nitrobenzaldehyde, p-nitrobenzaldehyde, o-methylbenzaldehyde, m-methylbenzaldehyde, p-methylbenzaldehyde, p-ethylbenzaldehyde, p-n-butylbenzaldehyde, and the like. These compounds may be used alone or in combination of two or more kinds. Among these compounds, for example, preferred are formaldehyde, paraformaldehyde, furfural, benzaldehyde, and salicylaldehyde, and most preferred are formaldehyde and paraformaldehyde.

Examples of the amine which to be used for obtaining the cationic phenol polycondensate (D) for use in the invention include monomethylamine, dimethylamine, trimethylamine, monoethylamine, diethylamine, triethylamine, isopropylamine, diisopropylamine, n-butylamine, di-n-butylamine, tri-n-butylamine, isobutylamine, diisobutylamine, sec-butylamine, n-amylamine, di-n-amylamine, tri-n-amylamine, sec-amylamine, sec-hexylamine, 2-ethylhexylamine, dioctylamine, ethanolamine, diethanolamine, triethanolamine, N-methylethanolamine, N-ethylethanolamine, N butylethanolamine, N,N-dimethylethanolamine, N,N-diethylethanolamine, N-ethyldiethanolamine, N-n-butyldiethanolamine, N,N-di-n-butylethanolamine, N-methylpropanolamine, triisopropanolamine, and the like. As the quaternizing agent, agents described for the production of the cationic urethane resin (C) can be used.

The acid catalyst which to be used for obtaining the cationic phenol polycondensate (D) for use in the invention is not particularly limited to the following examples including hydrochloric acid, sulfuric acid, phosphoric acid, formic acid, acetic acid, oxalic acid, butyric acid, lactic acid, benzenesulfonic acid, p-toluenesulfonate, tartaric acid, boric acid, and metal salts such as zinc chloride and zinc acetate. These catalysts may be used alone or in combination of two or more kinds.

The cationic phenol polycondensate (D) for use in the invention is contained in an amount of 25 mass % to 40 mass % with respect to the total solid content. At a cationic phenol polycondensate (D) content less than 25 mass %, ethanol resistance is deteriorated thereby causing problems such as that the resin readily forms into a gel in a coating liquid state, and at a cationic phenol polycondensate (D) content greater than 40 mass %, corrosion resistance after cylindrical forming is deteriorated.

The mass ratio (mass %) of the cationic urethane resin (C) to the cationic phenol polycondensate (D), which are contained in the metal surface treatment agent of the invention is preferably in the range of 40:60 to 49:51, more preferably in the range of 42:58 to 48:52, and most preferably 45:55. At a mass ratio of the cationic urethane resin (C) greater than 49 mass %, ethanol resistance is deteriorated.

The above-mentioned composition for surface treatment may also include other components as necessary, such as phosphoric acid or phosphate such as ammonium phosphate for the purpose of reducing coating appearance to take on a yellow tinge, or an organic solvent, a surfactant, or the like considering the coatability. For the surface treatment film, a cationic component excluding titanium and magnesium of metallic compounds is included, and additive components may also selectively be contained.

The zinc-plated steel sheet to which a surface treatment shall be subjected using the composition for surface treatment of the invention is not particularly limited, and examples thereof include zinc or zinc alloy-plated steel sheets such as a zinc-plated steel sheet, a zinc-nickel-plated steel sheet, a zinc-cobalt-plated steel sheet, a zinc-aluminum-plated steel sheet, a zinc-magnesium-plated steel sheet, a zinc-aluminum-magnesium-plated steel sheet, a zinc-iron-plated steel sheet, a zinc-chrome-plated steel sheet, and a zinc-manganese-plated steel sheet, which are applied by electroplating, hot dipping, or vapor-phase plating.

Next, a method of producing the surface treated steel sheet of the invention will be described. In order to form the surface treatment film on the surface of a zinc-plated steel sheet, a surface treatment agent which forms a film of the composition described above is applied until giving a predetermined value of dry film weight, and the resultant is heat dried without being washed with water. As the coating method, generally well-known method such as roll coater coating, dipping coating, or spray coating can be employed. As the means for heat drying after the coating, for example, a dryer, a hot-air oven, a high-frequency induction furnace, an infrared furnace, or the like can be used. The drying treatment is conducted preferably at a peak sheet temperature of about 50° C. to 250° C. When a drying temperature is below 50° C., a large amount of water content in the film remains and thus the corrosion resistance on a planar surface becomes insufficient. When a drying temperature is above 250° C., it is uneconomical and also there is a possibility that defects may be occurred to a film due to a partial heat decomposition of the resin component in the film. The surface treatment film described above may either be formed on one side or both sides of the steel sheet.

The dry weight of the film formed from the surface treatment agent of the invention is, for example, in the range of 0.1 $g/m^2$ to 3 $g/m^2$. At a film weight less than 0.1 $g/m^2$, corrosion resistance after cylindrical forming is insufficient, while at a film weight greater than 3 $g/m^2$, appearance after cylindrical forming is deteriorated.

In addition, for use in household appliances, a surface treated steel sheet having excellent lubrication property for the purpose of acting against the film receiving damages due to a squeeze molding, for example, in a cartridge tank for kerosene stoves, as well as having excellent corrosion resistance after forming, is demanded. Accordingly, the present inventors have found that to attain the corrosion resistance after the squeeze forming, it is effective if a well-known organic-inorganic composite film is provided on an upper layer of the surface treatment film for the above-mentioned surface treated steel sheet.

Hereinafter, a film agent for forming an organic-inorganic composite film will be described.

Examples of a resin to be used for the organic-inorganic composite film include an acrylic resin, an ethylene-acrylic acid copolymer resin, an epoxy resin, a polyol-based urethane resin, a polycarbonate-based urethane resin, an acryl-modified silicone resin, a silicone-modified urethane resin, a melamine-alkyd resin, fluorine-based resins, mixed products or addition polymers of two or more resins thereof, and the like. As the inorganic component, silica or the like is used for the purpose of improving the corrosion resistance. In addition, for a press molding, polyolefin wax, tetrafluoroethylene wax, or the like, may also be used as the solid lubricant to impart sliding or abrasion resistance to a steel sheet and to prevent surface galling or mold damage. In addition, for example, coloring agents such as inorganic/organic pigment and dyes, water-soluble epoxy, a curing agent such as a silane coupling agent, a solvent, a surfactant, or the like, may also be included.

The drying treatment after applying the organic-inorganic composite film agent is conducted at a peak sheet temperature of about 100° C. to 250° C. When a heating temperature is below 100° C., curing is insufficient and corrosion resistance on a planar surface deteriorates, and when a heating temperature is above 250° C., it is uneconomical and also the corrosion resistance on a planar surface deteriorates due to film defects caused by resin decomposition. As the surface treatment sheet, the resin film described above may also either be formed on one side or both sides of the steel sheet.

The film weight of the organic-inorganic composite film is, for example, in the range of 0.2 $g/m^2$ to 5 $g/m^2$. At a film weight less than 0.2 $g/m^2$, corrosion resistance after squeeze forming is insufficient, while at a film weight greater than 5 $g/m^2$, scum readily generates upon the squeeze forming thereby causing problems such as poor molding upon continuous press molding.

By providing an organic-inorganic composite film and/or a surface treatment (post-treatment) film including a titanium compound, a magnesium compound, a cationic urethane resin (hereinafter, referred to as urethane resin) which has at least one cationic functional group selected from primary to tertiary amino groups and quaternary ammonium bases, and a phenol polycondensate (hereinafter, referred to as phenol resin) which is a polycondensate of bisphenol A, amine, and formaldehyde, on the surface of the chromate-free surface treated steel sheet of the invention, remarkable white rust resistance, corrosion resistance after the forming, and ethanol resistance can be obtained. Mechanisms of exhibiting such properties are not clear, but possible exhibition mechanisms will be described below. However, the invention is not restricted to these.

It can be assumed that the following film-forming reaction and property exhibition are occurred when a post-treating agent of the invention is applied on a surface of the surface treated steel sheet and baking is performed.

An OH group on a benzene ring of the above-mentioned phenol resin in the surface treating (post-treating) agent of the invention, is polarized due to differences in electronegativities in water giving H (hydrogen) δ+ and O (oxygen) δ−, as well as titanium and magnesium in the metallic compounds containing titanium and magnesium give δ+ whereas the remainder gives δ−. Since change in both sides is occurred upon the film-forming reaction, positively charged titanium or magnesium forms a bond with O on a benzene ring due to an electrical interaction. Further, the above-mentioned positively charged titanium or magnesium combines with the surface of the surface treated steel sheet through negatively charged oxygen, thereby forming a strong crosslinked structure for the entire film. In particular, titanium provides strong covalent and thus contributes to enhance the crosslinked structure.

It is assumed that a strong adhesiveness is generated on the surface treated steel sheet/post-treated film interface due to the formation of crosslinked structure. An excellent interface adhesion property indicates that the corrosion factors such as water and salts hardly invade the interface. A barrier effect on corrosion factors of post-treated film itself, which is formed by a strong crosslinked structure as described above, is a fundamental factor for exhibiting corrosion resistance on a planar surface (corrosion resistance which is the base for a post-treated plated steel sheet) of unformed plate.

In addition, a surface potential uniformizing effect described below is also assumed to be the factor for exhibiting corrosion resistance on a planar surface.

The phenol resin is a compound having a resonance stabilization structure, and a titanium compound is a transition metal compound. The electron configuration of titanium is $3d^2 4s^2$, and electron acceptance takes place in the 3d orbital of inner shell whereas the electronic state in the 4s orbital of outermost shell does not change. Thus, titanium has an electronic buffer effect of 3d orbital, and the electrochemical property hardly changes even when electrons are accepted. A film formed by containing the phenol resin and the titanium compound reacts with a metallic surface and firmly bonds thereto, and thus an action of delocalizing electrons generated due to the corrosion of surface treated steel sheet, in 3d orbital of titanium and/or in a benzene ring of the phenol resin, is provided. Accordingly, the surface potential is uniformly kept. This is thought to be the cause of corrosion resistance provided on a planar surface.

However, the corrosion resistance on a planar surface of the surface treated steel sheet, and particularly the white rust resistance on a planar surface of the zinc-plated steel sheet, are insufficiently obtained only by the factor mentioned above. These properties are further improved by adding magnesium in a post-treated film. A mechanism for this exhibition is as follows.

Since magnesium in the crosslinked structure as described above exists near a surface of the surface treated steel sheet, thereby achieving stabilization of a dense initial corrosion product a representative example of which is basic zinc chloride produced on the surface treated steel sheet, particularly on an outermost layer of zinc plate, where the dense corrosion product serves as a barrier film, it can be assumed that the effect of preventing a white rust generation is thus exhibited. Therefore, it is essential for the invention that the phenol resin, the titanium compound, and the magnesium compound are coexisted, and remarkable effect of improving the corrosion resistance on a planar surface is found for the first time by allowing them to coexist.

Further to the above description, although titanium and magnesium provided from the metallic compounds containing titanium and magnesium which are blended in a post-treating agent are incorporated in a crosslinked structure in excess or deficiency, the excess distributes in the post-treated film or over the surface of a plating steel sheet as a metal salt, and migrates over the course of time in a corrosive environment over the surface of a plating steel sheet in a form of salt or cation. Accordingly, it can be assumed that the synergistic effect of passivation function of titanium and stabilization effect of magnesium on the dense initial corrosion product a representative example of which is basic zinc chloride contribute to prevention of rust generation on a plated steel sheet, particularly white rust generation on a zinc plate.

In addition, the corrosion resistance exhibiting effect of titanium and magnesium described above is also effective in parts of the plate where the plated steel sheet substrate is exposed which is caused by cracks or exfoliation of the post-treated film due to forming. Especially, in the case of zinc plate, since magnesium existing in the post-treated film migrates in a form of salt or cation over an exposed part of the plate and acts thereon, a dense initial corrosion product a representative example of which is basic zinc chloride is stabilized, and thus the corrosion resistance after forming is improved by preventing the white rust generation.

Meanwhile, corrosion resistance after forming such as cylindrical molding which accompanies cracks or surface rubbing of the post-treated film cannot be defined to be sufficient. Therefore, the present inventors have tried to introduce the above-mentioned urethane resin which provides flexibility for cracks and extension so as to improve the corrosion resistance after forming. When a suitable amount of urethane resin is added to a post-treating agent, and the post-treating agent is applied and then baking is subjected, a crosslinked structure is formed through a hydrogen bond, a van der Waals' force, or a strong interaction between a functional group on a side chain of the urethane resin and a polar group such as an OH group of the phenol resin. In addition, since the urethane resin and the phenol resin are distributed in a randomly entangled state over the entire film, the entire film is provided with flexibility and bears film cracking and exfoliation even upon a cylindrical molding. Thus, the post-treated film maintains the effect of preventing penetration of corrosion factors such as water and salts possessed by the film, and it is assumed to exhibit an excellent corrosion resistance after forming.

Evaluation on the appearance of cylindrical molded article is preferably conducted in accordance with the following appearance evaluation (ΔL values before and after the test) of cylindrical molding forming. The ΔL value said herein indicates a difference of L values before and after the test which are measured by colorimetry in accordance with Hunter technique. The evaluation can be made in accordance with the following standards:

<Evaluation Standard>
VG=white rust generated area is less than 5%
G=white rust generated area is 5% or more to less than 15%
NG=white rust generated area is 15% or more to less than 30%
B=white rust generated area is 30% or more to less than 50%
VB=white rust generated area is 50% or more The urethane resin is generally fully compatible with alcohol such as ethanol, and thus the resin has a property of swelling when brought into contact with alcohol, which thereby causes decrease in film properties such as that softening of post-treated film and film strength are deteriorated and penetration of corrosion factors into the film are promoted. According to the invention, the present inventors have found that decrease in ethanol resistance is prevented by controlling the mass ratio of the urethane resin to be not greater than that of the phenol resin in the film. In the case of a film wherein the urethane resin and the phenol resin are in a randomly entangled state and the phenol resin is mainly comprised, effect of controlling slack of the film caused by swelling of the urethane resin is exhibited, and thus exfoliation and damage of the film are hardly occurred even in a condition of contact with ethanol which accompanies rubbing, thereby it is assumed to exhibit significantly excellent ethanol resistance.

For the sliding test, a commercially available gauze is attached on a flat slide having a sliding side of 20 mm in diameter, ethanol is thoroughly impregnated, and then reciprocal sliding is repeated for 10 times under test conditions of pressure of 100 g/cm$^2$, amplification of 100 mm, and speed of 20 mm/sec, with the use of a commercially available Bowden tester. Thereafter, change in appearance of the sliding part of the treated sheet is evaluated in accordance with the following standards.

<Evaluation Standard>
VG=no change in appearance
G=slight change in appearance
NG=obvious change in appearance
B=partial exposure of substrate
VB=complete exposure of substrate As above, the present inventors have conducted extensive studies, and as a result, they have found that excellent ethanol resistance, corrosion resistance on a planar surface (white rust resistance), and corrosion resistance after forming can be obtained with balance by providing a post-treated film on a plating steel sheet by applying a post treatment agent containing a titanium compound, a magnesium compound, a urethane resin, and a phenol resin. From the viewpoint of improving the corrosion resistance after forming, there are no known methods as revealed in this invention that the above-mentioned 4 components are essentially blended for a post treatment in a suitable proportion and suitable amount, and the present invention is the first one showing such technique.

Also, it is hard to ensure that sufficient corrosion resistance can be obtained only by the above described way after carrying out a harsh molding, which may cause change in steel sheet thickness of the plating steel sheet, such as squeezing accompanying damages on a surface film. According to the invention, remarkable improvement on corrosion resistance even after a harsh forming such as squeezing can be obtained by providing an organic-inorganic composite film on the post-treated film. An assumed mechanism of exhibiting this property will be described.

When the organic-inorganic composite treating agent is applied and then baking is subjected, a crosslinked structure is formed through a hydrogen bond, a van der Waals' force, or a strong interaction between a side chain functional group having polarity of the urethane resin and an OH group or a polar group of a side chain functional group of the phenol resin, on an under layer of the post-treated film, and a side chain functional group having polarity on an upper layer of the organic-inorganic composite film. As a result, a double layer of organic-inorganic composite film and post-treated film providing interface adhesiveness is formed. Since the organic-inorganic composite film, in addition to many other properties of the post-treated film, has a function of preventing cracks or peeling off of the post-treated film due to a harsh forming such as squeezing, and also a barrier effect on corrosion factors of the film itself, it is assumed to exhibit excellent corrosion resistance after forming.

EXAMPLES

Hereinafter, the present invention will be described in more detail with reference to Examples and Comparative Examples, but the invention is not limited to these Examples.

The metallic materials to be treated, and the component (A), the component (B), the component (C), and the component (D), of the surface treatment composition, which were used for Examples and Comparative Examples are shown in Table 1, Table 2, Table 3, and descriptions below, respectively. The organic-inorganic composite film composition is shown in Table 4. Also, treatment methods of applying a treatment liquid and evaluation methods are described below, and the evaluation results are shown in Tables 5 to 14.

TABLE 1

Zinc-plated Steel Sheet

| No. | Type | Content |
|---|---|---|
| 1-1 | EG20 | Electrogalvanized steel sheet (Adhesion amount of 20 g/m$^2$ per a side) |
| 1-2 | ZL20 | Electrogalvanized-11 mass % nickel plated steel sheet (Adhesion amount of 20 g/m$^2$ per a side) |
| 1-3 | GI90 | Hot dip Zinc-0.2 mass % aluminum plated steel sheet (Adhesion amount of 90 g/m$^2$ per a side) |

[Table 2]

TABLE 2

Titanium Compound (A)

| | | No. | | | | | | | | | |
|---|---|---|---|---|---|---|---|---|---|---|---|
| | Type | 2-1 | 2-2 | 2-3 | 2-4 | 2-5 | 2-6 | 2-7 | 2-8 | 2-9 | 2-10 |
| A-1 | titanium hydrofluorate | ○ | ○ | ○ | ○ | — | — | ○ | ○ | ○ | ○ |
| A-2 | Titanium sulfate | — | ○ | — | — | — | — | — | — | — | — |
| A-3 | Titanium acetate | — | — | ○ | — | — | — | — | — | — | — |

TABLE 2-continued

| | | Titanium Compound (A) | | | | | | | | | |
|---|---|---|---|---|---|---|---|---|---|---|---|
| | | No. | | | | | | | | | |
| Type | | 2-1 | 2-2 | 2-3 | 2-4 | 2-5 | 2-6 | 2-7 | 2-8 | 2-9 | 2-10 |
| A-4 | Titanium nitrate | — | — | — | O | — | — | — | — | — | — |
| A-5 | Titanium phosphate | — | — | — | — | O | O | O | — | — | — |
| A-6 | Titanium carbonate | — | — | — | — | O | — | — | — | — | — |
| A-7 | Titanyl sulfate | — | — | — | — | — | O | — | — | — | — |
| A-8 | Diisopropoxytitanium bisacetylacetone | — | — | — | — | — | — | O | — | — | — |
| A-9 | Titanium laurate | — | — | — | — | — | — | — | O | — | — |
| A-10 | Titanium acetylacetonate | — | — | — | — | — | — | — | — | O | O |

Note)
each component is mixed in equal amount and mass ratio
O represents constituent

[Table 3]

TABLE 3

| | | Magnesium Compound (B) | | | | | | | | | |
|---|---|---|---|---|---|---|---|---|---|---|---|
| | | No. | | | | | | | | | |
| Type | | 3-1 | 3-2 | 3-3 | 3-4 | 3-5 | 3-6 | 3-7 | 3-8 | 3-9 | 3-10 |
| B-1 | Magnesium nitrate | — | — | — | O | — | O | — | — | O | — |
| B-2 | Magnesium sulfate | — | — | — | — | — | — | O | — | — | — |
| B-3 | Magnesium biphosphate | O | O | O | — | O | O | — | O | O | O |
| B-4 | Magnesium carbonate | — | O | — | — | O | — | — | — | — | — |
| B-5 | Magnesium acetate | — | — | O | — | — | — | — | — | — | — |
| B-6 | Magnesium fluoride | — | — | — | O | O | — | O | — | O | O |
| B-7 | Magnesium oxide | — | — | — | — | — | — | — | — | — | O |
| B-8 | Magnesium hydroxide | — | — | — | — | — | — | — | O | — | O |

Note)
each component is mixed in equal amount and mass ratio
O represents constituent (Components of Surface Treatment Composition)
(1) Cationic Urethane Resins (C)
(1-1) Cationic Urethane Resin (C-1)

150 parts by mass of polyether polyol (synthesis components: tetramethylene glycol and ethylene glycol, molecular weight of 1,500), 6 parts by mass of trimethylolpropane, 24 parts by mass of N-methyl-N,N-diethanolamine, 94 parts by mass of isophorone diisocyanate, and 135 parts by mass of methyl ethyl ketone were charged into a reaction vessel, and the mixture was reacted for 1 hour while maintaining the temperature at 70° C. to 75° C., to produce a urethane prepolymer. Into the reaction vessel, 15 parts by mass of dimethyl sulfate was charged, and the mixture was reacted for 30 to 60 minutes at a temperature between 50 and 60° C. to produce a cationic urethane prepolymer. Further into the reaction vessel, 576 parts by mass of water was charged, the mixture was homogeneously emulsified, and then the methyl ethyl ketone was recovered, to obtain a water-soluble cationic urethane resin (C-1).

(1-2) Cationic Urethane Resin (C-2)

135 parts by mass of polyester polyol (synthesis components: isophthalic acid, adipic acid, and 1,6-hexanediol, and ethylene glycol, molecular weight of 1,700), 5 parts by mass of trimethylolpropane, 22 parts by mass of N-methyl-N,N-diethanolamine, 86 parts by mass of isophorone diisocyanate, and 120 parts by mass of methyl ethyl ketone were charged into a reaction vessel, and the mixture was reacted for 1 hour while maintaining the temperature at 70° C. to 75° C., to produce a urethane prepolymer. Into the reaction vessel, 17 parts by mass of dimethyl sulfate was charged, and the mixture was reacted for 30 minutes to 60 minutes at a temperature between 50° C. and 60° C. to produce a cationic urethane prepolymer. Further into the reaction vessel, 615 parts by mass of water was charged, the mixture was homogeneously emulsified, and then the methyl ethyl ketone was recovered, to obtain a water-soluble cationic urethane resin (C-2).

(1-3) Cationic Polyurethane Resin (C-3)

130 parts by mass of polycarbonate polyol (synthesis components: 1,6-hexanecarbonatediol, and ethylene glycol, molecular weight of 2,000), 4 parts by mass of trimethylolpropane, 21 parts by mass of N-methyl-N,N-diethanolamine, 75 parts by mass of isophorone diisocyanate, and 115 parts by mass of methyl ethyl ketone were charged into a reaction vessel, and the mixture was reacted for 1 hour while maintaining the temperature at 70° C. to 75° C., to produce a urethane prepolymer. Into the reaction vessel, 22 parts by mass of dimethyl sulfate was charged, and the mixture was reacted for 30 minutes to 60 minutes at a temperature between 50° C. and 60° C. to produce a cationic urethane prepolymer. Further into the reaction vessel, 633 parts by mass of water was charged, the mixture was homogeneously emulsified, and then the methyl ethyl ketone was recovered, to obtain a water-soluble cationic polyurethane resin (C-3).

(1-4) Cationic Polyurethane Resin (C-4)

135 parts by mass of polyester polyol (synthesis components: isophthalic acid, adipic acid, 1,6-hexanediol, and ethylene glycol, molecular weight of 2,000), 5 parts by mass of trimethylolpropane, 22 parts by mass of N-methyl-N,N-diethanolamine, 86 parts by mass of isophorone diisocyanate, 1 part by mass of γ-aminopropyltriethoxysilane, and 120 parts by mass of methyl ethyl ketone were charged into a reaction vessel, and the mixture was reacted for 1 hour while maintaining the temperature at 70° C. to 75° C., to produce a urethane prepolymer. Into the reaction vessel, 17 parts by mass of dimethyl sulfate was charged, and the mixture was reacted for 30 to 60 minutes at a temperature between 50° C. and 60° C. to produce a cationic urethane prepolymer. Further into the reaction vessel, 615 parts by mass of water was charged, the mixture was homogeneously emulsified, and then the methyl ethyl ketone was recovered, to obtain a silyl-modified, water-soluble cationic polyurethane resin (C-4).

(1-5) Cationic Polyurethane Resin (C-5)

150 parts by mass of polycarbonate polyol (synthesis components: 1,3-dioxolan-2-one and 1,6-hexanediol, molecular weight of 1,700), 6 parts by mass of trimethylolpropane, 24 parts by mass of N-methyl-N,N-diethanolamine, 94 parts by mass of isophorone diisocyanate, 2 part by mass of N-(β-aminoethyl)γ-aminopropyltrimethoxysilane, and 135 parts by mass of methyl ethyl ketone were charged into a reaction vessel, and the mixture was reacted for 1 hour while maintaining the temperature at 70° C. to 75° C., to produce a urethane prepolymer. Into the reaction vessel, 15 parts by mass of dimethyl sulfate was charged, and the mixture was reacted for 30 minutes to 60 minutes at a temperature between 50° C. and 60° C. to produce a cationic urethane prepolymer. Further into the reaction vessel, 576 parts by mass of water was charged, the mixture was homogeneously emulsified, and then the methyl ethyl ketone was recovered, to obtain a silyl-modified, water-soluble cationic polyurethane resin (C-5).

(2) Cationic Phenol Polycondensates (D)

(2-1) Cationic Phenol Polycondensate (D-1)

Into a 1000 mL flask equipped with a reflux condenser, 1 mole of bisphenol A (228 g), and 0.3 g of p-toluenesulfonate as a catalyst, were charged, and the temperature inside was raised to 100° C. Thereto, 0.85 mol (69 g) of an aqueous solution of formaldehyde was added over 1 hour, and the mixture was reacted for 2 hours under reflux at 100° C. Thereafter, the reaction vessel was cooled with water and allowed to stand still. Once the cloudiness of an aqueous layer separated as an upper layer had disappeared, decantation was subjected to remove the aqueous layer, and the resultant was heated under stirring until it reaches the temperature between 170° C. and 175° C., to remove unreacted compounds and water content.

Next, the temperature was lowered down to 100° C., 234 g of butyl cellosolve was added to completely dissolve the polycondensate, and then 234 g of pure water was added. At a point where the temperature inside the system is 50° C., 1 mole of diethanolamine (75 g) was added. Thereto, 1 mole of an aqueous solution of formaldehyde (81.1 g) was added dropwise over about 1 hour at 50° C. Then, the temperature was raised to 80° C., and the reaction was allowed to take place under stirring for about 3 hours, to obtain a cationic phenol polycondensate (D-1).

(2-2) Cationic Phenol Polycondensate (D-2)

Into a 1000 mL flask equipped with a reflux condenser, 1 mole of phenol (96 g), and 0.3 g of p-toluenesulfonate as a catalyst, were charged, and the temperature inside was raised to 100° C. Thereto, 0.7 mol (56.8 g) of an aqueous solution of formaldehyde was added over 1 hour, and the mixture was reacted for 2 hours under reflux at 100° C. Thereafter, the reaction vessel was cooled with water and allowed to stand still. Once the cloudiness of an aqueous layer separated as an upper layer had disappeared, decantation was subjected to remove the aqueous layer, and the resultant was heated under stirring until it reaches the temperature between 170° C. and 175° C., to remove unreacted compounds and water content.

Next, the temperature was lowered down to 100° C., 234 g of butyl cellosolve was added to completely dissolve the polycondensate, and then 234 g of pure water was added. At a point where the temperature inside the system is 50° C., 1 mole of N-methylpropanolamine (89 g) was added. Thereto, 0.7 mole of an aqueous solution of formaldehyde (56.8 g) was added dropwise over about 1 hour at 50° C. Then, the temperature was raised to 80° C., and the reaction was allowed to take place under stirring for about 3 hours, to obtain a cationic phenol polycondensate (D-2).

(2-3) Cationic Phenol Polycondensate (D-3)

Into a 1000 mL flask equipped with a reflux condenser, 1 mole of o-cresol (108 g), and 0.3 g of p-toluenesulfonate as a catalyst, were charged, and the temperature inside was raised to 100° C. Thereto, 0.85 mol (69 g) of an aqueous solution of formaldehyde was added over 1 hour, and the mixture was reacted for 2 hours under reflux at 100° C. Thereafter, the reaction vessel was cooled with water and allowed to stand still. Once the cloudiness of an aqueous layer separated as an upper layer had disappeared, decantation was subjected to remove the aqueous layer, and the resultant was heated under stirring until it reaches the temperature between 170° C. and 175° C., to remove unreacted compounds and water content.

Next, the temperature was lowered down to 100° C., 234 g of butyl cellosolve was added to completely dissolve the polycondensate, and then 234 g of pure water was added. At a point where the temperature inside the system is 50° C., 1 mole of N,N-diethylethanolamine (117 g) was added. Thereto, 1 mole of an aqueous solution of formaldehyde (81.1 g) was added dropwise over about 1 hour at 50° C. Then, the temperature was raised to 80° C., and the reaction was allowed to take place under stirring for about 3 hours, to obtain a cationic phenol polycondensate (D-3).

TABLE 4

| | | Organic-inorganic Composite Film |||||||||| 
| | | No. |||||||||| 
| | | 4-1 | 4-2 | 4-3 | 4-4 | 4-5 | 4-6 | 4-7 | 4-8 | 4-9 | 4-10 |
|---|---|---|---|---|---|---|---|---|---|---|---|
| Organic resin | Acrylic resin | ○ | — | — | — | — | — | — | — | — | — |
| | Ethylene-acrylic acid copolymer resin | — | ○ | — | — | — | — | — | — | — | — |
| | Epoxy resin | — | — | ○ | — | — | — | — | — | — | — |
| | Polyol-based urethane resin | — | — | — | ○ | — | — | — | — | — | — |
| | Polycarbonate-based urethane resin | — | — | — | — | ○ | — | — | — | — | — |
| | Polyester-based urethane resin | — | — | — | — | — | ○ | — | — | — | — |
| | Silicone-modified urethane resin | — | — | — | — | — | — | ○ | — | — | — |
| | Acryl-modified silicone resin | — | — | — | — | — | — | — | ○ | — | — |

TABLE 4-continued

| | | \multicolumn{10}{c}{Organic-inorganic Composite Film No.} |
| --- | --- | --- | --- | --- | --- | --- | --- | --- | --- | --- | --- |
| | | 4-1 | 4-2 | 4-3 | 4-4 | 4-5 | 4-6 | 4-7 | 4-8 | 4-9 | 4-10 |
| Inorganic component | Fluorine-based resin | — | — | — | — | — | — | — | — | ○ | — |
| | Commercially available colloidal silica (average particle size: 20 nm) | ○ | ○ | ○ | ○ | ○ | ○ | ○ | — | — | ○ |
| | Commercially available dry silica (average particle size: 20 nm) | — | — | — | — | — | — | — | ○ | ○ | — |
| lubricant | Commercially available polyethylene-based wax (average particle size: 1 μm) | — | ○ | ○ | ○ | ○ | ○ | ○ | — | — | ○ |
| | Commercially available polypropylene-based wax (average particle size: 1 μm) | — | — | ○ | — | — | — | — | — | — | — |
| | Commercially available polytetrafluoroethylene-based wax (average particle size: 0.5 μm) | ○ | — | — | — | — | — | — | ○ | — | — |
| | Mass ratio of organic resin:inorganic component:lubricant | 60:25:15 | 70:20:10 | 65:20:15 | 70:20:10 | 70:20:10 | 60:25:15 | 70:20:10 | 70:20:10 | 80:20:0 | 70:20:10 |

Note)
lubricant component is mixed in equal amount and mass ratio
○ represents constituent (Treatment Method)

(1) Degreasing

A metallic material to be treated was degreased using PALKLIN N364S, an alkaline degreaser from Nihon Parkerizing Co., Ltd. (spraying the 20 g/L bath at 60° C. for 10 seconds with a spray pressure of 0.5 kg/cm$^2$), followed by rinsing with a 10-second spray of water.

(2) Application and Drying

The compositions for surface treatment and the treatment liquids for organic-inorganic composite film described in Tables 5 to 10 and Tables 11 to 14, were applied together on zinc-plated steel sheets with a roller coater, and the sheets were dried with heating at peak sheet temperatures of each condition. The film weight was adjusted by a solid content concentration of the treatment liquid or coating conditions (such as pressure of roller or rotation speed).

(Method of Measuring the Film Amount Adhered)

The weight difference before and after the application of the composition for surface treatment and the treatment liquid for organic-inorganic composite film to the steel sheet followed by dry is determined by a weight method, and divided by a coated area to give a film adhered amount.

(Method of Measuring Titanium Content and Magnesium Content)

The titanium content and the magnesium content in the composition for surface treatment were measured using an ICP emission spectrometry.

(Evaluation Methods)

(1) Ethanol Resistance

The treated sheet samples prepared in Examples 1 to 90 and Comparative Examples 1 to 31 were directly subjected to ethanol resistance test without being subjected to forming (planar surface). The evaluation method is as follows.

As mentioned above, for the sliding test, a commercially available gauze is attached on a flat slide having a sliding side of 20 mm in diameter, ethanol is thoroughly impregnated, and then reciprocal sliding is repeated for 10 times under test conditions of pressure of 100 g/cm$^2$, amplification of 100 mm, and speed of 20 mm/sec, with the use of a commercially available Bowden tester. Thereafter, change in appearance of the sliding part of the treated sheet is evaluated in accordance with the following standards.

<Evaluation Standard>
VG=no change in appearance
G=slight change in appearance
NG=obvious change in appearance
B=partial exposure of substrate
VB=complete exposure of substrate (2) Corrosion Resistance on Planar Surface (White Rust Resistance)

The treated sheet samples prepared in Examples 1 to 90 and Comparative Examples 1 to 31 were directly subjected to corrosion resistance test without being subjected to forming (planar surface). The evaluation method is as follows.

The white rust generated area was determined after 120 hours of salt spray in accordance with JIS-Z-2371, 'Salt-spray Testing Method'.

<Evaluation Standard>
VG=white rust generated area is less than 5%
G=white rust generated area is 5% or more to less than 15%
NG=white rust generated area is 15% or more to less than 30%
B=white rust generated area is 30% or more to less than 50%
VB=white rust generated area is 50% or more (3) Evaluation on Appearance after Cylindrical Forming and Corrosion Resistance The treated sheet samples prepared in Examples 1 to 90 and Comparative Examples 1 to 31 were subjected to cylindrical forming, and the appearance evaluation and the corrosion resistance test were conducted. The evaluation method is as follows.

For the cylindrical molding forming, the treated sheet samples prepared in Examples 1 to 90 and Comparative Examples 1 to 31 were punched into a circular form to give a blank diameter of 60 mm, a Press oil (PG 3080, produced by Nihon Kohsakuyu Co., Ltd.) was applied, and the resulting sheets were formed using a die for cylindrical molding forming having a dice diameter of 32 mm and a dice R of 2 mm, with a crank presser under the condition of 30 spm.

The evaluation on appearance of the cylindrical molded articles was evaluated using ΔL values before and after the test. As mentioned before, the ΔL value indicates a difference of L values before and after the test, provided that the degree of brightness classified from black (0) to white (100) is given as an L value. In specific, the measurement can be carried out with the use of a color-difference meter CR-300 (manufactured by MINOLTA).

<Evaluation Standard>
VG=ΔL is less than 2
G=ΔL is 2 or more to less than 5
NG=ΔL is 5 or more to less than 10
B=ΔL is 10 or more The corrosion resistance of cylindrical molded articles was evaluated by determining the white rust generated area after 24 hours of salt spray in accordance with JIS-Z-2371, 'Salt-spray Testing Method'.

<Evaluation Standard>
VG=white rust generated area is less than 10%
G=white rust generated area is 10% or more to less than 20%
NG=white rust generated area is 20% or more to less than 40%
B=white rust generated area is 40% or more to less than 80%
VB=white rust generated area is 80% or more (4) Evaluation on Appearance after Squeeze Forming and Corrosion Resistance The treated sheet samples prepared in Examples and Comparative Examples were subjected to squeeze molding forming, and the appearance (generation of scum) evaluation and the corrosion resistance test were conducted. The evaluation method is as follows.

For the squeeze molding forming, the treated sheet samples prepared in Examples 91 to 135 and Comparative Examples 34 to 78 were punched into a circular form to give a blank diameter of 60 mm, a Press oil (PG 3080, produced by Nihon Kohsakuyu Co., Ltd.) was applied, and the resulting sheets were formed using a die for cylindrical molding forming having a dice diameter of 30 mm and a dice R of 2 mm, with a crank presser under the condition of 30 spm. Thereafter, a second forming was conducted under conditions of a dice diameter of 25 mm and a dice R of 1 mm, with a combination of punch and dice that the clearance is 15% minus side to the thickness of the original sheet.

Scum developed upon the squeeze molding forming was removed by degreasing with a hydrocarbon solvent. The amount of scum developed was evaluated on the basis of weight variation between before and after the test, and also further evaluation was conducted on the basis of ΔL value variation between before and after the test.

<Evaluation Standard>
VG=weight decrease is less than 0.05 g/m$^2$, or ΔL is less than 2
G=weight decrease is 0.05 to less than 0.1 g/m$^2$, or ΔL is 2 to less than 5
NG=weight decrease is 0.1 to less than 0.5 g/m$^2$, or ΔL is 5 to less than 10
B=weight decrease is 0.5 g/m$^2$ or more, or ΔL is 10 or more The corrosion resistance of squeeze molded articles was evaluated by determining the white rust generated area after 16 hours of salt spray in accordance with JIS-Z-2371, 'Salt-spray Testing Method'.

<Evaluation Standard>
VG=white rust generated area is less than 10%
G=white rust generated area is 10% or more to less than 20%
NG=white rust generated area is 20% or more to less than 40%
B=white rust generated area is 40% or more to less than 80%
VB=white rust generated area is 80% or more The evaluation results are shown below.

TABLE 5

| | | Surface treatment film | | | | | | | | |
|---|---|---|---|---|---|---|---|---|---|---|
| | Zinc-plated steel sheet No. | Titanium compound (A) | | Magnesium compound (B) | | Urethane resin (C) | | Phenol polycondensation resin compound (D) | | Mass ratio of resin (C) to compound (D) |
| | | No. | Titanium mass ratio (mass %) | No. | Magnesium mass ratio (mass %) | No. | Resin weight ratio (mass %) | No. | Compound weight ratio (mass %) | Urethane resin (C) | Phenol polycondensation resin compound (D) |
| Examples 1 | 1-1 | 2-1 | 1 | 3-1 | 0.2 | C-1 | 20 | D-1 | 25 | 44.4 | 55.6 |
| 2 | 1-1 | 2-2 | 1 | 3-2 | 0.2 | C-2 | 20 | D-1 | 27 | 42.6 | 57.4 |
| 3 | 1-1 | 2-3 | 1 | 3-3 | 0.2 | C-3 | 20 | D-1 | 30 | 40.0 | 60.0 |
| 4 | 1-1 | 2-4 | 1 | 3-4 | 0.2 | C-4 | 20 | D-1 | 35 | 36.4 | 63.6 |

TABLE 5-continued

| | | | | | | | | | | | |
|---|---|---|---|---|---|---|---|---|---|---|---|
| 5 | 1-1 | 2-5 | 1 | 3-5 | 0.5 | C-5 | 20 | D-1 | 40 | 33.3 | 66.7 |
| 6 | 1-1 | 2-6 | 1 | 3-6 | 0.5 | C-1 | 25 | D-2 | 26 | 49.0 | 51.0 |
| 7 | 1-1 | 2-7 | 1 | 3-7 | 0.5 | C-2 | 25 | D-2 | 28 | 47.2 | 52.8 |
| 8 | 1-1 | 2-8 | 1 | 3-8 | 0.5 | C-3 | 25 | D-2 | 40 | 38.5 | 61.5 |
| 9 | 1-1 | 2-9 | 1 | 3-9 | 0.5 | C-4 | 30 | D-2 | 32 | 48.4 | 51.6 |
| 10 | 1-1 | 2-10 | 1 | 3-10 | 1.5 | C-5 | 30 | D-2 | 35 | 46.2 | 53.8 |
| 11 | 1-1 | 2-1 | 1 | 3-1 | 1.5 | C-1 | 30 | D-3 | 40 | 42.9 | 57.1 |
| 12 | 1-1 | 2-2 | 1 | 3-2 | 1.5 | C-2 | 32 | D-3 | 34 | 48.5 | 51.5 |
| 13 | 1-1 | 2-3 | 1 | 3-3 | 1.5 | C-3 | 32 | D-3 | 40 | 44.4 | 55.6 |
| 14 | 1-1 | 2-4 | 1 | 3-4 | 1.5 | C-4 | 33 | D-3 | 35 | 48.5 | 51.5 |
| 15 | 1-1 | 2-5 | 1 | 3-5 | 2.0 | C-5 | 33 | D-3 | 38 | 46.5 | 53.5 |
| 16 | 1-2 | 2-6 | 1 | 3-6 | 2.0 | C-1 | 33 | D-1 | 40 | 45.2 | 54.8 |
| 17 | 1-2 | 2-7 | 1 | 3-7 | 2.0 | C-2 | 34 | D-1 | 36 | 48.6 | 51.4 |
| 18 | 1-2 | 2-8 | 1 | 3-8 | 2.0 | C-3 | 34 | D-1 | 40 | 45.9 | 54.1 |
| 19 | 1-2 | 2-9 | 1 | 3-9 | 2.0 | C-4 | 35 | D-1 | 37 | 48.6 | 51.4 |
| 20 | 1-2 | 2-10 | 1 | 3-10 | 2.0 | C-5 | 35 | D-1 | 40 | 46.7 | 53.3 |
| 21 | 1-2 | 2-1 | 2 | 3-1 | 0.2 | C-1 | 20 | D-2 | 25 | 44.4 | 55.6 |
| 22 | 1-2 | 2-2 | 2 | 3-2 | 0.2 | C-2 | 20 | D-2 | 27 | 42.6 | 57.4 |
| 23 | 1-2 | 2-3 | 2 | 3-3 | 0.2 | C-3 | 20 | D-2 | 30 | 40.0 | 60.0 |

| | | Surface treatment film | | | Properties | | |
|---|---|---|---|---|---|---|---|
| | | Dry peak sheet temperature (°C.) | Film adhered amount (g/m$^2$) | Ethanol resistance | Corrosion resistance on planar surface (white rust resistance) | Appearance after cylindrical forming | Corrosion resistance after cylindrical forming |
| Examples | 1 | 50 | 0.1 | VG | G | VG | G |
| | 2 | 100 | 0.3 | VG | VG | VG | G |
| | 3 | 150 | 1.0 | VG | VG | VG | VG |
| | 4 | 200 | 2.0 | VG | VG | VG | VG |
| | 5 | 250 | 3.0 | VG | VG | VG | VG |
| | 6 | 250 | 0.1 | VG | G | VG | G |
| | 7 | 200 | 0.3 | VG | VG | VG | G |
| | 8 | 150 | 1.0 | VG | VG | VG | VG |
| | 9 | 100 | 2.0 | VG | VG | VG | VG |
| | 10 | 50 | 3.0 | VG | VG | VG | VG |
| | 11 | 50 | 0.1 | VG | G | VG | G |
| | 12 | 100 | 0.3 | VG | VG | VG | G |
| | 13 | 150 | 1.0 | VG | VG | VG | VG |
| | 14 | 200 | 2.0 | VG | VG | VG | VG |
| | 15 | 250 | 3.0 | VG | VG | VG | VG |
| | 16 | 250 | 0.1 | VG | G | VG | G |
| | 17 | 200 | 0.3 | VG | VG | VG | G |
| | 18 | 150 | 1.0 | VG | VG | VG | VG |
| | 19 | 100 | 2.0 | VG | VG | VG | VG |
| | 20 | 50 | 3.0 | VG | VG | VG | VG |
| | 21 | 50 | 0.1 | VG | G | VG | G |
| | 22 | 100 | 0.3 | VG | VG | VG | G |
| | 23 | 150 | 1.0 | VG | VG | VG | VG |

TABLE 6

| | | Surface treatment film | | | | | | | | Mass ratio of resin (C) to compound (D) | |
|---|---|---|---|---|---|---|---|---|---|---|---|
| | | Zinc-plated steel sheet No. | Titanium compound (A) | | Magnesium compound (B) | | Urethane resin (C) | | Phenol polycondensation resin compound (D) | | |
| | | | No. | Titanium mass ratio (mass %) | No. | Magnesium mass ratio (mass %) | No. | Resin weight ratio (mass %) | No. | Compound weight ratio (mass %) | Urethane resin (C) | Phenol polycondensation resin compound (D) |
| Examples | 24 | 1-2 | 2-4 | 2 | 3-4 | 0.2 | C-4 | 20 | D-2 | 35 | 36.4 | 63.6 |
| | 25 | 1-2 | 2-5 | 2 | 3-5 | 0.5 | C-5 | 20 | D-2 | 40 | 33.3 | 66.7 |
| | 26 | 1-2 | 2-6 | 2 | 3-6 | 0.5 | C-1 | 25 | D-3 | 26 | 49.0 | 51.0 |
| | 27 | 1-2 | 2-7 | 2 | 3-7 | 0.5 | C-2 | 25 | D-3 | 28 | 47.2 | 52.8 |
| | 28 | 1-2 | 2-8 | 2 | 3-8 | 0.5 | C-3 | 25 | D-3 | 40 | 38.5 | 61.5 |
| | 29 | 1-2 | 2-9 | 2 | 3-9 | 0.5 | C-4 | 30 | D-3 | 32 | 48.4 | 51.6 |
| | 30 | 1-2 | 2-10 | 2 | 3-10 | 1.5 | C-5 | 30 | D-3 | 35 | 46.2 | 53.8 |

TABLE 6-continued

| | | | | | | | | | | | |
|---|---|---|---|---|---|---|---|---|---|---|---|
| 31 | 1-3 | 2-1 | 2 | 3-1 | 1.5 | C-1 | 30 | D-1 | 40 | 42.9 | 57.1 |
| 32 | 1-3 | 2-2 | 2 | 3-2 | 1.5 | C-2 | 32 | D-1 | 34 | 48.5 | 51.5 |
| 33 | 1-3 | 2-3 | 2 | 3-3 | 1.5 | C-3 | 32 | D-1 | 40 | 44.4 | 55.6 |
| 34 | 1-3 | 2-4 | 2 | 3-4 | 1.5 | C-4 | 33 | D-1 | 35 | 48.5 | 51.5 |
| 35 | 1-3 | 2-5 | 2 | 3-5 | 2.0 | C-5 | 33 | D-1 | 38 | 46.5 | 53.5 |
| 36 | 1-3 | 2-6 | 2 | 3-6 | 2.0 | C-1 | 33 | D-2 | 40 | 45.2 | 54.8 |
| 37 | 1-3 | 2-7 | 2 | 3-7 | 2.0 | C-2 | 34 | D-2 | 36 | 48.6 | 51.4 |
| 38 | 1-3 | 2-8 | 2 | 3-8 | 2.0 | C-3 | 34 | D-2 | 40 | 45.9 | 54.1 |
| 39 | 1-3 | 2-9 | 2 | 3-9 | 2.0 | C-4 | 35 | D-2 | 37 | 48.6 | 51.4 |
| 40 | 1-3 | 2-10 | 2 | 3-10 | 2.0 | C-5 | 35 | D-2 | 40 | 46.7 | 53.3 |
| 41 | 1-3 | 2-1 | 3 | 3-1 | 0.2 | C-1 | 20 | D-3 | 25 | 44.4 | 55.6 |
| 42 | 1-3 | 2-2 | 3 | 3-2 | 0.2 | C-2 | 20 | D-3 | 27 | 42.6 | 57.4 |
| 43 | 1-3 | 2-3 | 3 | 3-3 | 0.2 | C-3 | 20 | D-3 | 30 | 40.0 | 60.0 |
| 44 | 1-3 | 2-4 | 3 | 3-4 | 0.2 | C-4 | 20 | D-3 | 35 | 36.4 | 63.6 |
| 45 | 1-3 | 2-5 | 3 | 3-5 | 0.5 | C-5 | 20 | D-3 | 40 | 33.3 | 66.7 |

| | | Surface treatment film | | | Properties | | | |
|---|---|---|---|---|---|---|---|---|
| | | Dry peak sheet temperature (° C.) | Film adhered amount (g/m$^2$) | Ethanol resistance | Corrosion resistance on planar surface (white rust resistance) | Appearance after cylindrical forming | Corrosion resistance after cylindrical forming | |
| Examples | 24 | 200 | 2.0 | VG | VG | VG | VG |
| | 25 | 250 | 3.0 | VG | VG | VG | VG |
| | 26 | 250 | 0.1 | VG | G | VG | G |
| | 27 | 200 | 0.3 | VG | VG | VG | G |
| | 28 | 150 | 1.0 | VG | VG | VG | VG |
| | 29 | 100 | 2.0 | VG | VG | VG | VG |
| | 30 | 50 | 3.0 | VG | VG | VG | VG |
| | 31 | 50 | 0.1 | VG | G | VG | G |
| | 32 | 100 | 0.3 | VG | VG | VG | VG |
| | 33 | 150 | 1.0 | VG | VG | VG | VG |
| | 34 | 200 | 2.0 | VG | VG | VG | VG |
| | 35 | 250 | 3.0 | VG | VG | VG | VG |
| | 36 | 250 | 0.1 | VG | G | VG | G |
| | 37 | 200 | 0.3 | VG | VG | VG | VG |
| | 38 | 150 | 1.0 | VG | VG | VG | VG |
| | 39 | 100 | 2.0 | VG | VG | VG | VG |
| | 40 | 50 | 3.0 | VG | VG | VG | VG |
| | 41 | 50 | 0.1 | VG | G | VG | G |
| | 42 | 100 | 0.3 | VG | VG | VG | VG |
| | 43 | 150 | 1.0 | VG | VG | VG | VG |
| | 44 | 200 | 2.0 | VG | VG | VG | VG |
| | 45 | 250 | 3.0 | VG | VG | VG | VG |

TABLE 7

| | | Surface treatment film | | | | | | | | | |
|---|---|---|---|---|---|---|---|---|---|---|---|
| | | Zinc-plated steel sheet No. | Titanium compound (A) | | Magnesium compound (B) | | Urethane resin (C) | | Phenol polycondensation resin compound (D) | | Mass ratio of resin (C) to compound (D) |
| | | | No. | Titanium mass ratio (mass %) | No. | Magnesium mass ratio (mass %) | No. | Resin weight ratio (mass %) | No. | Compound weight ratio (mass %) | Urethane resin (C) / Phenol polycondensation resin compound (D) |
| Examples | 46 | 1-1 | 2-6 | 3 | 3-6 | 0.5 | C-1 | 25 | D-1 | 26 | 49.0 / 51.0 |
| | 47 | 1-1 | 2-7 | 3 | 3-7 | 0.5 | C-2 | 25 | D-1 | 28 | 47.2 / 52.8 |
| | 48 | 1-1 | 2-8 | 3 | 3-8 | 0.5 | C-3 | 25 | D-1 | 40 | 38.5 / 61.5 |
| | 49 | 1-1 | 2-9 | 3 | 3-9 | 0.5 | C-4 | 30 | D-1 | 32 | 48.4 / 51.6 |
| | 50 | 1-1 | 2-10 | 3 | 3-10 | 1.5 | C-5 | 30 | D-1 | 35 | 46.2 / 53.8 |
| | 51 | 1-1 | 2-1 | 3 | 3-1 | 1.5 | C-1 | 30 | D-2 | 40 | 42.9 / 57.1 |
| | 52 | 1-1 | 2-2 | 3 | 3-2 | 1.5 | C-2 | 32 | D-2 | 34 | 48.5 / 51.5 |
| | 53 | 1-1 | 2-3 | 3 | 3-3 | 1.5 | C-3 | 32 | D-2 | 40 | 44.4 / 55.6 |
| | 54 | 1-1 | 2-4 | 3 | 3-4 | 1.5 | C-4 | 33 | D-2 | 35 | 48.5 / 51.5 |
| | 55 | 1-1 | 2-5 | 3 | 3-5 | 2.0 | C-5 | 33 | D-2 | 38 | 46.5 / 53.5 |
| | 56 | 1-1 | 2-6 | 3 | 3-6 | 2.0 | C-1 | 33 | D-3 | 40 | 45.2 / 54.8 |
| | 57 | 1-1 | 2-7 | 3 | 3-7 | 2.0 | C-2 | 34 | D-3 | 36 | 48.6 / 51.4 |

TABLE 7-continued

| | | | | | | | | | | | |
|---|---|---|---|---|---|---|---|---|---|---|---|
| 58 | 1-1 | 2-8 | 3 | 3-8 | 2.0 | C-3 | 34 | D-3 | 40 | 45.9 | 54.1 |
| 59 | 1-1 | 2-9 | 3 | 3-9 | 2.0 | C-4 | 35 | D-3 | 37 | 48.6 | 51.4 |
| 60 | 1-1 | 2-10 | 3 | 3-10 | 2.0 | C-5 | 35 | D-3 | 40 | 46.7 | 53.3 |
| 61 | 1-2 | 2-1 | 4 | 3-1 | 0.2 | C-1 | 20 | D-1 | 25 | 44.4 | 55.6 |
| 62 | 1-2 | 2-2 | 4 | 3-2 | 0.2 | C-2 | 20 | D-1 | 27 | 42.6 | 57.4 |
| 63 | 1-2 | 2-3 | 4 | 3-3 | 0.2 | C-3 | 20 | D-1 | 30 | 40.0 | 60.0 |
| 64 | 1-2 | 2-4 | 4 | 3-4 | 0.2 | C-4 | 20 | D-1 | 35 | 36.4 | 63.6 |
| 65 | 1-2 | 2-5 | 4 | 3-5 | 0.2 | C-5 | 20 | D-1 | 40 | 33.3 | 66.7 |
| 66 | 1-2 | 2-6 | 4 | 3-6 | 0.5 | C-1 | 25 | D-2 | 26 | 49.0 | 51.0 |
| 67 | 1-2 | 2-7 | 4 | 3-7 | 0.5 | C-2 | 25 | D-2 | 28 | 47.2 | 52.8 |
| 68 | 1-2 | 2-8 | 4 | 3-8 | 0.5 | C-3 | 25 | D-2 | 40 | 38.5 | 61.5 |

| | | Surface treatment film | | Properties | | | |
|---|---|---|---|---|---|---|---|
| | | Dry peak sheet temperature (°C.) | Film adhered amount (g/m$^2$) | Ethanol resistance | Corrosion resistance on planar surface (white rust resistance) | Appearance after cylindrical forming | Corrosion resistance after cylindrical forming |
| Examples | 46 | 50 | 0.1 | VG | G | VG | G |
| | 47 | 100 | 0.3 | VG | VG | VG | G |
| | 48 | 150 | 1.0 | VG | VG | VG | VG |
| | 49 | 200 | 2.0 | VG | VG | VG | VG |
| | 50 | 250 | 3.0 | VG | VG | VG | VG |
| | 51 | 250 | 0.1 | VG | G | VG | G |
| | 52 | 200 | 0.3 | VG | VG | VG | G |
| | 53 | 150 | 1.0 | VG | VG | VG | VG |
| | 54 | 100 | 2.0 | VG | VG | VG | VG |
| | 55 | 50 | 3.0 | VG | VG | VG | VG |
| | 56 | 50 | 0.1 | VG | G | VG | G |
| | 57 | 100 | 0.3 | VG | VG | VG | G |
| | 58 | 150 | 1.0 | VG | VG | VG | VG |
| | 59 | 200 | 2.0 | VG | VG | VG | VG |
| | 60 | 250 | 3.0 | VG | VG | VG | VG |
| | 61 | 250 | 0.1 | VG | G | VG | G |
| | 62 | 200 | 0.3 | VG | VG | VG | G |
| | 63 | 150 | 1.0 | VG | VG | VG | VG |
| | 64 | 100 | 2.0 | VG | VG | VG | VG |
| | 65 | 50 | 3.0 | VG | VG | VG | VG |
| | 66 | 50 | 0.1 | VG | G | VG | G |
| | 67 | 100 | 0.3 | VG | VG | VG | G |
| | 68 | 150 | 1.0 | VG | VG | VG | VG |

TABLE 8

| | | Surface treatment film | | | | | | | | |
|---|---|---|---|---|---|---|---|---|---|---|
| | | Zinc-plated steel sheet No. | Titanium compound (A) | | Magnesium compound (B) | | Urethane resin (C) | | Phenol polycondensation resin compound (D) | | Mass ratio of resin (C) to compound (D) | |
| | | | No. | Titanium mass ratio (mass %) | No. | Magnesium mass ratio (mass %) | No. | Resin weight ratio (mass %) | No. | Compound weight ratio (mass %) | Urethane resin (C) | Phenol polycondensation resin compound (D) |
| Examples | 69 | 1-2 | 2-9 | 4 | 3-9 | 0.5 | C-4 | 30 | D-2 | 32 | 48.4 | 51.6 |
| | 70 | 1-2 | 2-10 | 4 | 3-10 | 1.5 | C-5 | 30 | D-2 | 35 | 46.2 | 53.8 |
| | 71 | 1-2 | 2-1 | 4 | 3-1 | 1.5 | C-1 | 30 | D-3 | 40 | 42.9 | 57.1 |
| | 72 | 1-2 | 2-2 | 4 | 3-2 | 1.5 | C-2 | 32 | D-3 | 34 | 48.5 | 51.5 |
| | 73 | 1-2 | 2-3 | 4 | 3-3 | 1.5 | C-3 | 32 | D-3 | 40 | 44.4 | 55.6 |
| | 74 | 1-2 | 2-4 | 4 | 3-4 | 1.5 | C-4 | 33 | D-3 | 35 | 48.5 | 51.5 |
| | 75 | 1-2 | 2-5 | 4 | 3-5 | 2.0 | C-5 | 33 | D-3 | 38 | 46.5 | 53.5 |
| | 76 | 1-3 | 2-6 | 4 | 3-6 | 2.0 | C-1 | 33 | D-1 | 40 | 45.2 | 54.8 |
| | 77 | 1-3 | 2-7 | 4 | 3-7 | 2.0 | C-2 | 34 | D-1 | 36 | 48.6 | 51.4 |
| | 78 | 1-3 | 2-8 | 4 | 3-8 | 2.0 | C-3 | 34 | D-1 | 40 | 45.9 | 54.1 |
| | 79 | 1-3 | 2-9 | 4 | 3-9 | 2.0 | C-4 | 35 | D-1 | 37 | 48.6 | 51.4 |
| | 80 | 1-3 | 2-10 | 4 | 3-10 | 2.0 | C-5 | 35 | D-1 | 40 | 46.7 | 53.3 |
| | 81 | 1-3 | 2-1 | 4 | 3-1 | 0.5 | C-1 | 20 | D-2 | 25 | 44.4 | 55.6 |
| | 82 | 1-3 | 2-2 | 4 | 3-2 | 0.5 | C-2 | 20 | D-2 | 25 | 44.4 | 55.6 |
| | 83 | 1-3 | 2-3 | 4 | 3-3 | 0.5 | C-3 | 20 | D-2 | 25 | 44.4 | 55.6 |

TABLE 8-continued

| | | | | | | | | | | | |
|---|---|---|---|---|---|---|---|---|---|---|---|
| 84 | 1-3 | 2-4 | 4 | 3-4 | 0.5 | C-4 | 20 | D-2 | 25 | 44.4 | 55.6 |
| 85 | 1-3 | 2-5 | 4 | 3-5 | 1.0 | C-5 | 20 | D-2 | 25 | 44.4 | 55.6 |
| 86 | 1-3 | 2-6 | 4 | 3-6 | 1.0 | C-1 | 20 | D-3 | 25 | 44.4 | 55.6 |
| 87 | 1-3 | 2-7 | 4 | 3-7 | 1.0 | C-2 | 20 | D-3 | 25 | 44.4 | 55.6 |
| 88 | 1-3 | 2-8 | 4 | 3-8 | 1.0 | C-3 | 20 | D-3 | 25 | 44.4 | 55.6 |
| 89 | 1-3 | 2-9 | 4 | 3-9 | 1.0 | C-4 | 20 | D-3 | 25 | 44.4 | 55.6 |
| 90 | 1-3 | 2-10 | 4 | 3-10 | 1.0 | C-5 | 20 | D-3 | 25 | 44.4 | 55.6 |

| | | Surface treatment film | | Properties | | | |
|---|---|---|---|---|---|---|---|
| | | Dry peak sheet temperature (° C.) | Film adhered amount (g/m$^2$) | Ethanol resistance | Corrosion resistance on planar surface (white rust resistance) | Appearance after cylindrical forming | Corrosion resistance after cylindrical forming |
| Examples | 69 | 200 | 2.0 | VG | VG | VG | VG |
| | 70 | 250 | 3.0 | VG | VG | VG | VG |
| | 71 | 250 | 0.1 | VG | G | VG | G |
| | 72 | 200 | 0.3 | VG | VG | VG | G |
| | 73 | 150 | 1.0 | VG | VG | VG | VG |
| | 74 | 100 | 2.0 | VG | VG | VG | VG |
| | 75 | 50 | 3.0 | VG | VG | VG | VG |
| | 76 | 50 | 0.1 | VG | G | VG | G |
| | 77 | 100 | 0.3 | VG | VG | VG | VG |
| | 78 | 150 | 1.0 | VG | VG | VG | VG |
| | 79 | 200 | 2.0 | VG | VG | VG | VG |
| | 80 | 250 | 3.0 | VG | VG | VG | VG |
| | 81 | 250 | 0.1 | VG | G | VG | G |
| | 82 | 200 | 0.3 | VG | VG | VG | VG |
| | 83 | 150 | 1.0 | VG | VG | VG | VG |
| | 84 | 100 | 2.0 | VG | VG | VG | VG |
| | 85 | 50 | 3.0 | VG | VG | VG | VG |
| | 86 | 50 | 0.1 | VG | G | VG | G |
| | 87 | 100 | 0.3 | VG | VG | VG | VG |
| | 88 | 150 | 1.0 | VG | VG | VG | VG |
| | 89 | 200 | 2.0 | VG | VG | VG | VG |
| | 90 | 250 | 3.0 | VG | VG | VG | VG |

TABLE 9

| | | Surface treatment film | | | | | | | | | |
|---|---|---|---|---|---|---|---|---|---|---|---|
| | | Zinc-plated steel sheet No. | Titanium compound (A) | | Magnesium compound (B) | | Urethane resin (C) | | Phenol polycondensation resin compound (D) | | Mass ratio of resin (C) to compound (D) |
| | | | No. | Titanium mass ratio (mass %) | No. | Magnesium mass ratio (mass %) | No. | Resin weight ratio (mass %) | No. | Compound weight ratio (mass %) | Urethane resin (C) | Phenol polycondensation resin compound (D) |
| Examples | 91 | 1-1 | 2-1 | 1 | 3-1 | 0.2 | C-1 | 20 | D-1 | 25 | 44.4 | 55.6 |
| | 92 | 1-1 | 2-2 | 1 | 3-2 | 0.2 | C-2 | 20 | D-1 | 27 | 42.6 | 57.4 |
| | 93 | 1-1 | 2-3 | 1 | 3-3 | 0.2 | C-3 | 20 | D-1 | 30 | 40.0 | 60.0 |
| | 94 | 1-1 | 2-4 | 1 | 3-4 | 0.2 | C-4 | 20 | D-1 | 35 | 36.4 | 63.6 |
| | 95 | 1-1 | 2-5 | 1 | 3-5 | 0.5 | C-5 | 20 | D-1 | 40 | 33.3 | 66.7 |
| | 96 | 1-1 | 2-6 | 1 | 3-6 | 0.5 | C-1 | 25 | D-2 | 26 | 49.0 | 51.0 |
| | 97 | 1-1 | 2-7 | 1 | 3-7 | 0.5 | C-2 | 25 | D-2 | 28 | 47.2 | 52.8 |
| | 98 | 1-1 | 2-8 | 1 | 3-8 | 0.5 | C-3 | 25 | D-2 | 40 | 38.5 | 61.5 |
| | 99 | 1-1 | 2-9 | 1 | 3-9 | 0.5 | C-4 | 30 | D-2 | 32 | 48.4 | 51.6 |
| | 100 | 1-1 | 2-10 | 1 | 3-10 | 1.5 | C-5 | 30 | D-2 | 35 | 46.2 | 53.8 |
| | 101 | 1-1 | 2-1 | 1 | 3-1 | 1.5 | C-1 | 30 | D-3 | 40 | 42.9 | 57.1 |
| | 102 | 1-1 | 2-2 | 1 | 3-2 | 1.5 | C-2 | 32 | D-3 | 34 | 48.5 | 51.5 |
| | 103 | 1-1 | 2-3 | 1 | 3-3 | 1.5 | C-3 | 32 | D-3 | 40 | 44.4 | 55.6 |
| | 104 | 1-1 | 2-4 | 1 | 3-4 | 1.5 | C-4 | 33 | D-3 | 35 | 48.5 | 51.5 |
| | 105 | 1-1 | 2-5 | 1 | 3-5 | 2.0 | C-5 | 33 | D-3 | 38 | 46.5 | 53.5 |
| | 106 | 1-2 | 2-6 | 1 | 3-6 | 2.0 | C-1 | 33 | D-1 | 40 | 45.2 | 54.8 |
| | 107 | 1-2 | 2-7 | 1 | 3-7 | 2.0 | C-2 | 34 | D-1 | 36 | 48.6 | 51.4 |
| | 108 | 1-2 | 2-8 | 1 | 3-8 | 2.0 | C-3 | 34 | D-1 | 40 | 45.9 | 54.1 |
| | 109 | 1-2 | 2-9 | 1 | 3-9 | 2.0 | C-4 | 35 | D-1 | 37 | 48.6 | 51.4 |

TABLE 9-continued

| | | | | | | | | | | | |
|---|---|---|---|---|---|---|---|---|---|---|---|
| 110 | 1-2 | 2-10 | 1 | 3-10 | 2.0 | C-5 | 35 | D-1 | 40 | 46.7 | 53.3 |
| 111 | 1-2 | 2-1 | 2 | 3-1 | 0.2 | C-1 | 20 | D-2 | 25 | 44.4 | 55.6 |
| 112 | 1-2 | 2-2 | 2 | 3-2 | 0.2 | C-2 | 20 | D-2 | 27 | 42.6 | 57.4 |

| | | | Surface treatment film | | Organic-inorganic composite treatment film | | | Properties | |
|---|---|---|---|---|---|---|---|---|---|
| | | | Dry peak sheet temp* (° C.) | Film adhere amt* (g/m²) | No. | Dry peak sheet temp (° C.) | Film adhere amt (g/m²) | Appearance after squeeze forming | Corrosion resistance after squeeze forming |
| Examples | 91 | | 50 | 0.1 | 4-1 | 100 | 0.2 | VG | G |
| | 92 | | 100 | 0.3 | 4-2 | 150 | 0.2 | VG | VG |
| | 93 | | 150 | 1.0 | 4-3 | 180 | 0.2 | VG | VG |
| | 94 | | 200 | 2.0 | 4-4 | 200 | 0.2 | VG | VG |
| | 95 | | 250 | 3.0 | 4-5 | 250 | 0.2 | VG | VG |
| | 96 | | 250 | 0.1 | 4-6 | 100 | 0.5 | VG | G |
| | 97 | | 200 | 0.3 | 4-7 | 150 | 0.5 | VG | VG |
| | 98 | | 150 | 1.0 | 4-8 | 180 | 0.5 | VG | VG |
| | 99 | | 100 | 2.0 | 4-9 | 200 | 0.5 | VG | VG |
| | 100 | | 50 | 3.0 | 4-10 | 250 | 0.5 | VG | VG |
| | 101 | | 50 | 0.1 | 4-1 | 100 | 1.0 | VG | VG |
| | 102 | | 100 | 0.3 | 4-2 | 150 | 1.0 | VG | VG |
| | 103 | | 150 | 1.0 | 4-3 | 180 | 1.0 | VG | VG |
| | 104 | | 200 | 2.0 | 4-4 | 200 | 1.0 | VG | VG |
| | 105 | | 250 | 3.0 | 4-5 | 250 | 1.0 | VG | VG |
| | 106 | | 250 | 0.1 | 4-6 | 100 | 2.0 | VG | VG |
| | 107 | | 200 | 0.3 | 4-7 | 150 | 2.0 | VG | VG |
| | 108 | | 150 | 1.0 | 4-8 | 180 | 2.0 | VG | VG |
| | 109 | | 100 | 2.0 | 4-9 | 200 | 2.0 | VG | VG |
| | 110 | | 50 | 3.0 | 4-10 | 250 | 2.0 | VG | VG |
| | 111 | | 50 | 0.1 | 4-1 | 100 | 3.0 | VG | VG |
| | 112 | | 100 | 0.3 | 4-2 | 150 | 3.0 | VG | VG | temp*: temperature,
adhere amt*: adhered amount

TABLE 10

| | | | Surface treatment film | | | | | | | |
|---|---|---|---|---|---|---|---|---|---|---|
| | | Zinc-plated steel sheet No. | Titanium compound (A) | | Magnesium compound (B) | | Urethane resin (C) Resin weight ratio (mass %) | Phenol polycondensation resin compound (D) | | Mass ratio of resin (C) to compound (D) |
| | | | No. | Titanium mass ratio (mass %) | No. | Magnesium mass ratio (mass %) | | Compound No. | weight ratio (mass %) | Urethane resin (C) | Phenol polycondensation resin compound (D) |
| Examples | 113 | 1-2 | 2-3 | 2 | 3-3 | 0.2 | C-3 | 20 | D-2 | 30 | 40.0 | 60.0 |
| | 114 | 1-2 | 2-4 | 2 | 3-4 | 0.2 | C-4 | 20 | D-2 | 35 | 36.4 | 63.6 |
| | 115 | 1-2 | 2-5 | 2 | 3-5 | 0.5 | C-5 | 20 | D-2 | 40 | 33.3 | 66.7 |
| | 116 | 1-2 | 2-6 | 2 | 3-6 | 0.5 | C-1 | 25 | D-3 | 26 | 49.0 | 51.0 |
| | 117 | 1-2 | 2-7 | 2 | 3-7 | 0.5 | C-2 | 25 | D-3 | 28 | 47.2 | 52.8 |
| | 118 | 1-2 | 2-8 | 2 | 3-8 | 0.5 | C-3 | 25 | D-3 | 40 | 38.5 | 61.5 |
| | 119 | 1-2 | 2-9 | 2 | 3-9 | 0.5 | C-4 | 30 | D-3 | 32 | 48.4 | 51.6 |
| | 120 | 1-2 | 2-10 | 2 | 3-10 | 1.5 | C-5 | 30 | D-3 | 35 | 46.2 | 53.8 |
| | 121 | 1-3 | 2-1 | 2 | 3-1 | 1.5 | C-1 | 30 | D-1 | 40 | 42.9 | 57.1 |
| | 122 | 1-3 | 2-2 | 2 | 3-2 | 1.5 | C-2 | 32 | D-1 | 34 | 48.5 | 51.5 |
| | 123 | 1-3 | 2-3 | 2 | 3-3 | 1.5 | C-3 | 32 | D-1 | 40 | 44.4 | 55.6 |
| | 124 | 1-3 | 2-4 | 2 | 3-4 | 1.5 | C-4 | 33 | D-1 | 35 | 48.5 | 51.5 |
| | 125 | 1-3 | 2-5 | 2 | 3-5 | 2.0 | C-5 | 33 | D-1 | 38 | 46.5 | 53.5 |
| | 126 | 1-3 | 2-6 | 2 | 3-6 | 2.0 | C-1 | 33 | D-2 | 40 | 45.2 | 54.8 |
| | 127 | 1-3 | 2-7 | 2 | 3-7 | 2.0 | C-2 | 34 | D-2 | 36 | 48.6 | 51.4 |
| | 128 | 1-3 | 2-8 | 2 | 3-8 | 2.0 | C-3 | 34 | D-2 | 40 | 45.9 | 54.1 |
| | 129 | 1-3 | 2-9 | 2 | 3-9 | 2.0 | C-4 | 35 | D-2 | 37 | 48.6 | 51.4 |
| | 130 | 1-3 | 2-10 | 2 | 3-10 | 2.0 | C-5 | 35 | D-2 | 40 | 46.7 | 53.3 |
| | 131 | 1-3 | 2-1 | 3 | 3-1 | 0.2 | C-1 | 20 | D-3 | 25 | 44.4 | 55.6 |
| | 132 | 1-3 | 2-2 | 3 | 3-2 | 0.2 | C-2 | 20 | D-3 | 27 | 42.6 | 57.4 |
| | 133 | 1-3 | 2-3 | 3 | 3-3 | 0.2 | C-3 | 20 | D-3 | 30 | 40.0 | 60.0 |

TABLE 10-continued

| | | | | | | | | | | | |
|---|---|---|---|---|---|---|---|---|---|---|---|
| 134 | 1-3 | 2-4 | 3 | 3-4 | 0.2 | C-4 | 20 | D-3 | 35 | 36.4 | 63.6 |
| 135 | 1-3 | 2-5 | 3 | 3-5 | 0.5 | C-5 | 20 | D-3 | 40 | 33.3 | 66.7 |

| | | | Surface treatment film | | Organic-inorganic composite treatment film | | | Properties | |
|---|---|---|---|---|---|---|---|---|---|
| | | | Dry peak sheet temp* (°C.) | Film adhere amt* (g/m²) | No. | Dry peak sheet temp (°C.) | Film adhere amt (g/m²) | Appearance after squeeze forming | Corrosion resistance after squeeze forming |
| Examples | | 113 | 150 | 1.0 | 4-3 | 180 | 3.0 | VG | VG |
| | | 114 | 200 | 2.0 | 4-4 | 200 | 3.0 | VG | VG |
| | | 115 | 250 | 3.0 | 4-5 | 250 | 3.0 | G | G |
| | | 116 | 250 | 0.1 | 4-6 | 100 | 3.5 | VG | VG |
| | | 117 | 200 | 0.3 | 4-7 | 150 | 3.5 | VG | VG |
| | | 118 | 150 | 1.0 | 4-8 | 180 | 3.5 | VG | G |
| | | 119 | 100 | 2.0 | 4-9 | 200 | 3.5 | G | G |
| | | 120 | 50 | 3.0 | 4-10 | 250 | 3.5 | G | G |
| | | 121 | 50 | 0.1 | 4-1 | 100 | 4.0 | VG | VG |
| | | 122 | 100 | 0.3 | 4-2 | 150 | 4.0 | VG | VG |
| | | 123 | 150 | 1.0 | 4-3 | 180 | 4.0 | VG | VG |
| | | 124 | 200 | 2.0 | 4-4 | 200 | 4.0 | G | G |
| | | 125 | 250 | 3.0 | 4-5 | 250 | 4.0 | G | G |
| | | 126 | 250 | 0.1 | 4-6 | 100 | 4.5 | VG | VG |
| | | 127 | 200 | 0.3 | 4-7 | 150 | 4.5 | VG | VG |
| | | 128 | 150 | 1.0 | 4-8 | 180 | 4.5 | G | G |
| | | 129 | 100 | 2.0 | 4-9 | 200 | 4.5 | G | G |
| | | 130 | 50 | 3.0 | 4-10 | 250 | 4.5 | G | G |
| | | 131 | 50 | 0.1 | 4-1 | 100 | 5.0 | G | G |
| | | 132 | 100 | 0.3 | 4-2 | 150 | 5.0 | G | G |
| | | 133 | 150 | 1.0 | 4-3 | 180 | 5.0 | G | G |
| | | 134 | 200 | 2.0 | 4-4 | 200 | 5.0 | G | G |
| | | 135 | 250 | 3.0 | 4-5 | 250 | 5.0 | G | G | temp*: temperature,
adhere amt*: adhered amount

TABLE 11

| | | Surface treatment film | | | | | | | | | |
|---|---|---|---|---|---|---|---|---|---|---|---|
| | | Zinc-plated steel sheet No. | Titanium compound (A) | | Magnesium compound (B) | | Urethane resin (C) | | Phenol polycondensation resin compound (D) | | Mass ratio of resin (C) to compound (D) |
| | | | No. | Titanium mass ratio (mass %) | No. | Magnesium mass ratio (mass %) | No. | Resin weight ratio (mass %) | No. | Compound weight ratio (mass %) | Urethane resin (C) | Phenol polycondensation resin compound (D) |
| Comp. Examples | 1 | 1-1 | 2-1 | 0.7 | 3-1 | 1.0 | C-1 | 20 | D-1 | 25 | 44.4 | 55.6 |
| | 2 | 1-1 | 2-2 | 0.9 | 3-2 | 1.0 | C-2 | 20 | D-1 | 25 | 44.4 | 55.6 |
| | 3 | 1-1 | 2-3 | 4.1 | 3-3 | 1.0 | C-3 | 20 | D-1 | 25 | 44.4 | 55.6 |
| | 4 | 1-1 | 2-4 | 4.3 | 3-4 | 1.0 | C-4 | 20 | D-1 | 25 | 44.4 | 55.6 |
| | 5 | 1-1 | 2-5 | 2.0 | 3-5 | 0.1 | C-5 | 20 | D-1 | 25 | 44.4 | 55.6 |
| | 6 | 1-1 | 2-6 | 2.0 | 3-6 | 0.15 | C-1 | 20 | D-2 | 25 | 44.4 | 55.6 |
| | 7 | 1-1 | 2-7 | 2.0 | 3-7 | 2.1 | C-2 | 20 | D-2 | 25 | 44.4 | 55.6 |
| | 8 | 1-1 | 2-8 | 2.0 | 3-8 | 2.3 | C-3 | 20 | D-2 | 25 | 44.4 | 55.6 |
| | 9 | 1-1 | 2-3 | 2.0 | 3-3 | 1.0 | C-3 | 25 | D-3 | 25 | 50.0 | 50.0 |
| | 10 | 1-1 | 2-4 | 2.0 | 3-4 | 1.0 | C-4 | 28 | D-3 | 29 | 49.1 | 50.9 |
| | 11 | 1-1 | 2-5 | 2.0 | 3-5 | 1.0 | C-5 | 32 | D-3 | 33 | 49.2 | 50.8 |
| | 12 | 1-2 | 2-6 | 2.0 | 3-6 | 1.0 | C-1 | 35 | D-1 | 25 | 58.3 | 41.7 |
| | 13 | 1-2 | 2-5 | 2.0 | 3-5 | 1.0 | C-5 | 18 | D-2 | 32 | 36.0 | 64.0 |
| | 14 | 1-2 | 2-6 | 2.0 | 3-6 | 1.0 | C-1 | 37 | D-3 | 32 | 53.6 | 46.4 |
| | 15 | 1-2 | 2-7 | 2.0 | 3-7 | 1.0 | C-2 | 28 | D-3 | 24 | 53.8 | 46.2 |

TABLE 11-continued

|  |  | | Surface treatment film | | Properties | | | |
|---|---|---|---|---|---|---|---|---|
|  |  | | | | | Corrosion resistance on planar | | Corrosion |
|  |  | | Dry peak sheet temperature (° C.) | Film adhered amount (g/m²) | Ethanol resistance | surface (white rust resistance) | Appearance after cylindrical forming | resistance after cylindrical forming |
| Comp. Examples | 1 | | 150 | 2.0 | VG | B | G | NG |
| | 2 | | 150 | 2.0 | VG | B | G | NG |
| | 3 | | 150 | 2.0 | VG | NG | NG | B |
| | 4 | | 150 | 2.0 | VG | NG | NG | B |
| | 5 | | 150 | 2.0 | G | B | G | NG |
| | 6 | | 150 | 2.0 | G | B | G | NG |
| | 7 | | 150 | 2.0 | G | NG | G | B |
| | 8 | | 150 | 2.0 | G | NG | G | B |
| | 9 | | 150 | 2.0 | NG | VG | VG | G |
| | 10 | | 150 | 2.0 | NG | VG | VG | G |
| | 11 | | 150 | 2.0 | NG | VG | VG | G |
| | 12 | | 150 | 2.0 | B | G | G | NG |
| | 13 | | 150 | 2.0 | G | VG | VG | NG |
| | 14 | | 150 | 2.0 | B | VG | NG | NG |
| | 15 | | 150 | 2.0 | B | G | G | NG |

Comp. Examples: Comparative Examples

TABLE 12

| | | Surface treatment film | | | | | | | | | |
|---|---|---|---|---|---|---|---|---|---|---|---|
| | | Zinc-plated steel sheet No. | Titanium compound (A) | | Magnesium compound (B) | | Urethane resin (C) | | Phenol polycondensation resin compound (D) | | Mass ratio of resin (C) to compound (D) | |
| | | | No. | Titanium mass ratio (mass %) | No. | Magnesium mass ratio (mass %) | No. | Resin weight ratio (mass %) | No. | Compound weight ratio (mass %) | Urethane resin (C) | Phenol polycondensation resin compound (D) |
| Comp. Examples | 16 | 1-2 | 2-8 | 2.0 | 3-8 | 1.0 | C-3 | 28 | D-3 | 42 | 40.0 | 60.0 |
| | 17 | 1-2 | 2-9 | 2.0 | 3-9 | 1.0 | C-4 | 25 | D-3 | 25 | 50.0 | 50.0 |
| | 18 | 1-2 | 2-10 | 2.0 | 3-10 | 1.0 | C-5 | 26 | D-3 | 25 | 51.0 | 49.0 |
| | 19 | 1-3 | 2-1 | 2.0 | 3-1 | 1.0 | C-1 | 27 | D-1 | 28 | 49.1 | 50.9 |
| | 20 | 1-3 | 2-2 | 2.0 | 3-2 | 1.0 | C-2 | 28 | D-1 | 26 | 51.9 | 48.1 |
| | 21 | 1-3 | 2-3 | 2.0 | 3-3 | 1.0 | C-3 | 30 | D-1 | 25 | 54.5 | 45.5 |
| | 22 | 1-3 | 2-4 | 2.0 | 3-4 | 1.0 | C-4 | 31 | D-1 | 30 | 50.8 | 49.2 |
| | 23 | 1-3 | 2-5 | 2.0 | 3-5 | 1.0 | C-5 | 33 | D-1 | 28 | 54.1 | 45.9 |
| | 24 | 1-3 | 2-6 | 2.0 | 3-6 | 1.0 | C-1 | 35 | D-2 | 25 | 58.3 | 41.7 |
| | 25 | 1-3 | 2-9 | 2.0 | 3-9 | 1.0 | C-4 | 20 | D-2 | 25 | 44.4 | 55.6 |
| | 26 | 1-3 | 2-10 | 2.0 | 3-10 | 1.0 | C-5 | 20 | D-2 | 25 | 44.4 | 55.6 |
| | 27 | 1-3 | 2-1 | 3 | 3-1 | 0.2 | C-1 | 18 | D-3 | 32 | 36.0 | 64.0 |
| | 28 | 1-3 | 2-2 | 3 | 3-2 | 0.2 | C-2 | 37 | D-3 | 32 | 53.6 | 46.4 |
| | 29 | 1-3 | 2-3 | 3 | 3-3 | 0.2 | C-3 | 28 | D-3 | 24 | 53.8 | 46.2 |
| | 30 | 1-3 | 2-4 | 3 | 3-4 | 0.2 | C-4 | 28 | D-3 | 42 | 40.0 | 60.0 |
| | 31 | 1-3 | 2-5 | 3 | 3-5 | 0.5 | C-5 | 28 | D-3 | 45 | 38.4 | 61.6 |

| | | Surface treatment film | | Properties | | | |
|---|---|---|---|---|---|---|---|
| | | | | | Corrosion resistance on planar | | Corrosion |
| | | Dry peak sheet temperature (° C.) | Film adhered amount (g/m²) | Ethanol resistance | surface (white rust resistance) | Appearance after cylindrical forming | resistance after cylindrical forming |
| Comp. Examples | 16 | 150 | 2.0 | G | G | G | B |
| | 17 | 150 | 2.0 | NG | VG | VG | G |
| | 18 | 150 | 2.0 | NG | VG | G | G |
| | 19 | 150 | 2.0 | NG | VG | VG | G |
| | 20 | 150 | 2.0 | NG | VG | G | G |
| | 21 | 150 | 2.0 | B | VG | G | G |

TABLE 12-continued

|  |  |  |  |  |  |  |
|---|---|---|---|---|---|---|
| 22 | 150 | 2.0 | B | VG | G | G |
| 23 | 150 | 2.0 | B | VG | G | G |
| 24 | 150 | 2.0 | B | VG | G | G |
| 25 | 150 | 0.08 | VG | B | NG | B |
| 26 | 150 | 3.1 | VG | VG | NG | NG |
| 27 | 50 | 0.1 | NG | G | G | B |
| 28 | 100 | 0.3 | B | G | G | NG |
| 29 | 150 | 1.0 | NG | G | NG | NG |
| 30 | 200 | 2.0 | VG | G | G | NG |
| 31 | 250 | 3.0 | VG | VG | G | NG |

Comp Examples: Comparative Examples

TABLE 13

| | | Surface treatment film | | | | | | | | |
|---|---|---|---|---|---|---|---|---|---|---|
| | | Zinc-plated steel sheet No. | Titanium compound (A) | | Magnesium compound (B) | | Urethane resin (C) | | Phenol polycondensation resin compound (D) | | Mass ratio of resin (C) to compound (D) |
| | | | No. | Titanium mass ratio (mass %) | No. | Magnesium mass ratio (mass %) | No. | Resin weight ratio (mass %) | No. | Compound weight ratio (mass %) | Urethane resin (C) | Phenol polycondensation resin compound (D) |
| Comp. Examples | 34 | 1-1 | 2-1 | 1 | 3-1 | 0.2 | C-1 | 20 | D-1 | 25 | 44.4 | 55.6 |
| | 35 | 1-1 | 2-2 | 1 | 3-2 | 0.2 | C-2 | 20 | D-1 | 27 | 42.6 | 57.4 |
| | 36 | 1-1 | 2-3 | 1 | 3-3 | 0.2 | C-3 | 20 | D-1 | 30 | 40.0 | 60.0 |
| | 37 | 1-1 | 2-4 | 1 | 3-4 | 0.2 | C-4 | 20 | D-1 | 35 | 36.4 | 63.6 |
| | 38 | 1-1 | 2-5 | 1 | 3-5 | 0.5 | C-5 | 20 | D-1 | 40 | 33.3 | 66.7 |
| | 39 | 1-1 | 2-6 | 1 | 3-6 | 0.5 | C-1 | 25 | D-2 | 26 | 49.0 | 51.0 |
| | 40 | 1-1 | 2-7 | 1 | 3-7 | 0.5 | C-2 | 25 | D-2 | 28 | 47.2 | 52.8 |
| | 41 | 1-1 | 2-8 | 1 | 3-8 | 0.5 | C-3 | 25 | D-2 | 40 | 38.5 | 61.5 |
| | 42 | 1-1 | 2-9 | 1 | 3-9 | 0.5 | C-4 | 30 | D-2 | 32 | 48.4 | 51.6 |
| | 43 | 1-1 | 2-10 | 1 | 3-10 | 1.5 | C-5 | 30 | D-2 | 35 | 46.2 | 53.8 |
| | 44 | 1-1 | 2-1 | 1 | 3-1 | 1.5 | C-1 | 30 | D-3 | 40 | 42.9 | 57.1 |
| | 45 | 1-1 | 2-2 | 1 | 3-2 | 1.5 | C-2 | 32 | D-3 | 34 | 48.5 | 51.5 |
| | 46 | 1-1 | 2-3 | 1 | 3-3 | 1.5 | C-3 | 32 | D-3 | 40 | 44.4 | 55.6 |
| | 47 | 1-1 | 2-4 | 1 | 3-4 | 1.5 | C-4 | 33 | D-3 | 35 | 48.5 | 51.5 |
| | 48 | 1-1 | 2-5 | 1 | 3-5 | 2.0 | C-5 | 33 | D-3 | 38 | 46.5 | 53.5 |
| | 49 | 1-2 | 2-6 | 1 | 3-6 | 2.0 | C-1 | 33 | D-1 | 40 | 45.2 | 54.8 |
| | 50 | 1-2 | 2-7 | 1 | 3-7 | 2.0 | C-2 | 34 | D-1 | 36 | 48.6 | 51.4 |
| | 51 | 1-2 | 2-8 | 1 | 3-8 | 2.0 | C-3 | 34 | D-1 | 40 | 45.9 | 54.1 |
| | 52 | 1-2 | 2-9 | 1 | 3-9 | 2.0 | C-4 | 35 | D-1 | 37 | 48.6 | 51.4 |
| | 53 | 1-2 | 2-10 | 1 | 3-10 | 2.0 | C-5 | 35 | D-1 | 40 | 46.7 | 53.3 |
| | 54 | 1-2 | 2-1 | 2 | 3-1 | 0.2 | C-1 | 20 | D-2 | 25 | 44.4 | 55.6 |
| | 55 | 1-2 | 2-2 | 2 | 3-2 | 0.2 | C-2 | 20 | D-2 | 27 | 42.6 | 57.4 |

| | | Surface treatment film | | Organic-inorganic composite treatment film Dry | | | Properties | |
|---|---|---|---|---|---|---|---|---|
| | | Dry peak sheet temp* (° C.) | Film adhere amt* (g/m$^2$) | No. | peak sheet temp (° C.) | Film adhere amt (g/m$^2$) | Appearance after squeeze forming | Corrosion resistance after squeeze forming |
| Comp. Examples | 34 | 50 | 0.1 | 4-1 | 88 | 0.2 | NG | B |
| | 35 | 100 | 0.3 | 4-2 | 93 | 0.5 | NG | NG |
| | 36 | 150 | 1.0 | 4-3 | 95 | 1.0 | NG | NG |
| | 37 | 200 | 2.0 | 4-4 | 97 | 2.0 | NG | NG |
| | 38 | 250 | 3.0 | 4-5 | 98 | 3.0 | NG | NG |
| | 39 | 250 | 0.1 | 4-6 | 252 | 3.5 | NG | NG |
| | 40 | 200 | 0.3 | 4-7 | 253 | 4.0 | NG | NG |
| | 41 | 150 | 1.0 | 4-8 | 255 | 4.5 | NG | NG |
| | 42 | 100 | 2.0 | 4-9 | 260 | 5.0 | NG | NG |
| | 43 | 50 | 3.0 | 4-10 | 270 | 5.0 | NG | NG |
| | 44 | 50 | 0.1 | 4-1 | 150 | 0.10 | B | B |
| | 45 | 100 | 0.3 | 4-2 | 150 | 0.10 | B | G |
| | 46 | 150 | 1.0 | 4-3 | 180 | 0.10 | B | G |
| | 47 | 200 | 2.0 | 4-4 | 180 | 0.15 | B | G |
| | 48 | 250 | 3.0 | 4-5 | 180 | 0.18 | B | G |
| | 49 | 250 | 0.1 | 4-6 | 180 | 5.1 | NG | G |

TABLE 13-continued

| | | | | | | | | |
|---|---|---|---|---|---|---|---|---|
| | 50 | 200 | 0.3 | 4-7 | 180 | 5.3 | NG | G |
| | 51 | 150 | 1.0 | 4-8 | 180 | 5.3 | NG | VG |
| | 52 | 100 | 2.0 | 4-9 | 150 | 5.5 | NG | VG |
| | 53 | 50 | 3.0 | 4-10 | 150 | 5.5 | NG | VG |
| | 54 | 50 | 0.1 | 4-1 | 88 | 0.2 | NG | NG |
| | 55 | 100 | 0.3 | 4-2 | 93 | 0.5 | NG | NG |

Comp. Examples: Comparative Examples
temp*: temperature,
adhere amt*: adhered amount

TABLE 14

| | | Zinc-plated steel sheet No. | Titanium compound (A) | | Magnesium compound (B) | | Urethane resin (C) | | Phenol polycondensation resin compound (D) | | Mass ratio of resin (C) to compound (D) | |
|---|---|---|---|---|---|---|---|---|---|---|---|---|
| | | | No. | Titanium mass ratio (mass %) | No. | Magnesium mass ratio (mass %) | No. | Resin weight ratio (mass %) | No. | Compound weight ratio (mass %) | Urethane resin (C) | Phenol polycondensation resin compound (D) |
| Comp. Examples | 56 | 1-2 | 2-3 | 2 | 3-3 | 0.2 | C-3 | 20 | D-2 | 30 | 40.0 | 60.0 |
| | 57 | 1-2 | 2-4 | 2 | 3-4 | 0.2 | C-4 | 20 | D-2 | 35 | 36.4 | 63.6 |
| | 58 | 1-2 | 2-5 | 2 | 3-5 | 0.5 | C-5 | 20 | D-2 | 40 | 33.3 | 66.7 |
| | 59 | 1-2 | 2-6 | 2 | 3-6 | 0.5 | C-1 | 25 | D-3 | 26 | 49.0 | 51.0 |
| | 60 | 1-2 | 2-7 | 2 | 3-7 | 0.5 | C-2 | 25 | D-3 | 28 | 47.2 | 52.8 |
| | 61 | 1-2 | 2-8 | 2 | 3-8 | 0.5 | C-3 | 25 | D-3 | 40 | 38.5 | 61.5 |
| | 62 | 1-2 | 2-9 | 2 | 3-9 | 0.5 | C-4 | 30 | D-3 | 32 | 48.4 | 51.6 |
| | 63 | 1-2 | 2-10 | 2 | 3-10 | 1.5 | C-5 | 30 | D-3 | 35 | 46.2 | 53.8 |
| | 64 | 1-3 | 2-1 | 2 | 3-1 | 1.5 | C-1 | 30 | D-1 | 40 | 42.9 | 57.1 |
| | 65 | 1-3 | 2-2 | 2 | 3-2 | 1.5 | C-2 | 32 | D-1 | 34 | 48.5 | 51.5 |
| | 66 | 1-3 | 2-3 | 2 | 3-3 | 1.5 | C-3 | 32 | D-1 | 40 | 44.4 | 55.6 |
| | 67 | 1-3 | 2-4 | 2 | 3-4 | 1.5 | C-4 | 33 | D-1 | 35 | 48.5 | 51.5 |
| | 68 | 1-3 | 2-5 | 2 | 3-5 | 2.0 | C-5 | 33 | D-1 | 38 | 46.5 | 53.5 |
| | 69 | 1-3 | 2-6 | 2 | 3-6 | 2.0 | C-1 | 33 | D-2 | 40 | 45.2 | 54.8 |
| | 70 | 1-3 | 2-7 | 2 | 3-7 | 2.0 | C-2 | 34 | D-2 | 36 | 48.6 | 51.4 |
| | 71 | 1-3 | 2-8 | 2 | 3-8 | 2.0 | C-3 | 34 | D-2 | 40 | 45.9 | 54.1 |
| | 72 | 1-3 | 2-9 | 2 | 3-9 | 2.0 | C-4 | 35 | D-2 | 37 | 48.6 | 51.4 |
| | 73 | 1-3 | 2-10 | 2 | 3-10 | 2.0 | C-5 | 35 | D-2 | 40 | 46.7 | 53.3 |
| | 74 | 1-3 | 2-1 | 3 | 3-1 | 0.2 | C-1 | 20 | D-3 | 25 | 44.4 | 55.6 |
| | 75 | 1-3 | 2-2 | 3 | 3-2 | 0.2 | C-2 | 20 | D-3 | 27 | 42.6 | 57.4 |
| | 76 | 1-3 | 2-3 | 3 | 3-3 | 0.2 | C-3 | 20 | D-3 | 30 | 40.0 | 60.0 |
| | 77 | 1-3 | 2-4 | 3 | 3-4 | 0.2 | C-4 | 20 | D-3 | 35 | 36.4 | 63.6 |
| | 78 | 1-3 | 2-5 | 3 | 3-5 | 0.5 | C-5 | 20 | D-3 | 40 | 33.3 | 66.7 |

| | | Surface treatment film | | Organic-inorganic composite treatment film | | | Properties | |
|---|---|---|---|---|---|---|---|---|
| | | Dry peak sheet temp* (° C.) | Film adhere amt* (g/m²) | No. | Dry peak sheet temp (° C.) | Film adhere amt (g/m²) | Appearance after squeeze forming | Corrosion resistance after squeeze forming |
| Comp. Examples | 56 | 150 | 1.0 | 4-3 | 95 | 1.0 | NG | NG |
| | 57 | 200 | 2.0 | 4-4 | 97 | 2.0 | NG | NG |
| | 58 | 250 | 3.0 | 4-5 | 98 | 3.0 | NG | NG |
| | 59 | 250 | 0.1 | 4-6 | 252 | 3.5 | NG | NG |
| | 60 | 200 | 0.3 | 4-7 | 253 | 4.0 | NG | NG |
| | 61 | 150 | 1.0 | 4-8 | 255 | 4.5 | NG | NG |
| | 62 | 100 | 2.0 | 4-9 | 260 | 5.0 | NG | NG |
| | 63 | 50 | 3.0 | 4-10 | 270 | 5.0 | NG | NG |
| | 64 | 50 | 0.1 | 4-1 | 150 | 0.10 | B | B |
| | 65 | 100 | 0.3 | 4-2 | 150 | 0.10 | B | NG |
| | 66 | 150 | 1.0 | 4-3 | 180 | 0.10 | B | NG |
| | 67 | 200 | 2.0 | 4-4 | 180 | 0.15 | B | G |
| | 68 | 250 | 3.0 | 4-5 | 180 | 0.18 | B | VG |
| | 69 | 250 | 0.1 | 4-6 | 180 | 5.1 | B | VG |
| | 70 | 200 | 0.3 | 4-7 | 180 | 5.3 | B | VG |
| | 71 | 150 | 1.0 | 4-8 | 180 | 5.3 | B | VG |
| | 72 | 100 | 2.0 | 4-9 | 150 | 5.5 | B | VG |

TABLE 14-continued

| | | | | | | | |
|---|---|---|---|---|---|---|---|
| 73 | 50  | 3.0 | 4-10 | 150 | 5.5 | B | VG |
| 74 | 50  | 0.1 | 4-1  | —   | —   | B | B  |
| 75 | 100 | 0.3 | 4-2  | —   | —   | B | B  |
| 76 | 150 | 1.0 | 4-3  | —   | —   | B | B  |
| 77 | 200 | 2.0 | 4-4  | —   | —   | B | B  |
| 78 | 250 | 3.0 | 4-5  | —   | —   | B | B  |

Comp. Examples: Comparative Examples
temp*: temperature,
adhere amt*: adhered amount As shown from evaluation results of Tables 5 and 6, the steel sheets of the present invention (Examples 1 to 90) which were prepared by employing the method of producing a surface treatment film according to the invention were excellent in all of ethanol resistance, corrosion resistance on a planar surface, corrosion resistance after cylindrical forming, and appearance after cylindrical forming. In comparison, as shown from evaluation results of Tables 11 and 12, when conditions were outside the range of the invention (Comparative Examples 1 to 31), at least one of the above evaluations was poor.

In addition, as shown from evaluation results of Tables 9 and 10, the steel sheets of the invention (Examples 91 to 135) in which an organic-inorganic composite film was applied on the surface treatment film, respectively, were excellent in corrosion resistance after squeeze forming and appearance after squeeze forming. In comparison, as shown from evaluation results of Table 6-2, when conditions were outside the range of the invention (Comparative Examples 34 to 78), at least one of the above evaluations was poor.

Accordingly, it is realized that the present invention exhibits all of excellent ethanol resistance, corrosion resistance on a planar surface, corrosion resistance after cylindrical forming, appearance after cylindrical forming, corrosion resistance after squeeze forming, and appearance after squeeze forming, by providing a predetermined weight of the film comprising each constitution mentioned above on the surface of a zinc-plated steel sheet.

As described above, the surface treated steel sheet according to the invention is a chromium-free surface treated composition and exhibits corrosion resistance after forming equal to or better than that provided with a chromate-based surface treatment agent. In addition, the invention is suitable for various uses such as household appliances and building materials, as the production method thereof is simple and it can be produced at low cost.

Up to now, preferred embodiments of the invention are described, but there is no doubt that the invention is not limited to those Examples. It is obvious that various changed examples or modified examples can be suggested by those skilled in the art within the category mentioned in claims, and those examples certainly are thought to be in the technical scope of the invention.

INDUSTRIAL APPLICABILITY

The chromium-free zinc-plated steel sheet subjected to a metal surface treatment of the present invention is provided with all of excellent ethanol resistance, corrosion resistance on a planar surface, corrosion resistance after cylindrical forming, appearance after cylindrical forming, corrosion resistance after squeeze forming, and appearance after squeeze forming, and thus is effective as one of proposed measures for social problems such as environmental conservation. The present invention is particularly expected to be used in the fields of household appliances provided by accompanying forming such as motor cases or cartridge for kerosene stoves and building materials provided by accompanying forming such as guardrails.

The invention claimed is:

1. A surface treated steel sheet comprising:
a surface treatment film comprising a metallic compound containing titanium, a metallic compound containing magnesium, a cationic urethane resin having at least one cationic functional group selected from primary to tertiary amino groups and quaternary ammonium bases, and a cationic phenol polycondensate,
wherein the cationic phenol polycondensate is a polycondensate of a phenol compound with an aldehyde and has a cationic functional group,
wherein the titanium content in the surface treatment film is in the range of 1 mass % to 4 mass % based on a total solid content,
the magnesium content in the surface treatment film is in the range of 0.2 mass % to 2 mass % based on a total solid content,
the cationic urethane resin content in the surface treatment film is in the range of 20 mass % to 35 mass % based on a total solid content,
the cationic phenol polycondensate content in the surface treatment film is in the range of 25 mass % to 40 mass % based on a total solid content, and
the mass ratio of the cationic urethane resin to the cationic phenol polycondensate is in the range of 33.3:66.7 to 45.2:54.8.

2. The surface treated steel sheet according to claim 1, wherein a coating weight of the surface treatment film is from 0.1 g/m$^2$ to 3 g/m$^2$.

3. The surface treated steel sheet according to claim 1 or 2, wherein an organic-inorganic composite film is further formed on an upper layer of the surface treatment film in a coating weight of 0.2 g/m$^2$ to 5 g/m$^2$.

* * * * *